United States Patent
Aurongzeb et al.

(10) Patent No.: US 12,493,063 B2
(45) Date of Patent: Dec. 9, 2025

(54) SYSTEM AND METHOD FOR PREDICTING INCREASE IN GREENHOUSE GAS EMISSIONS DURING OPERATION OF CLIENT INFORMATION HANDLING SYSTEM OVER DEVICE LIFE CYCLE

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 697 days.

(21) Appl. No.: 17/954,014

(22) Filed: Sep. 27, 2022

(65) Prior Publication Data
US 2024/0103051 A1   Mar. 28, 2024

(51) Int. Cl.
*G01R 21/00* (2006.01)
*G06F 1/28* (2006.01)
(Continued)

(52) U.S. Cl.
CPC .............. *G01R 21/00* (2013.01); *G06F 1/28* (2013.01); *G06F 11/3062* (2013.01); *G06N 3/08* (2013.01)

(58) Field of Classification Search
CPC ....... G01R 21/00; G06F 11/3062; G06F 1/28; G06N 3/08
See application file for complete search history.

(56) References Cited

U.S. PATENT DOCUMENTS 7,694,291 B2    4/2010  Chen
8,595,234 B2   11/2013  Siripurapu
(Continued)

FOREIGN PATENT DOCUMENTS

WO    2011/106160 A2    9/2011

OTHER PUBLICATIONS

Pavel Skvortsov, Dennis Hoppe, Axel Tenschert, Michael Gienger (Monitoring in the Clouds: Comparison of ECO2 Clouds and EXCESS Monitoring Approaches) (Year: 2016).*
(Continued)

*Primary Examiner* — Eman A Alkafawi
*Assistant Examiner* — Joseph O Nyamogo
(74) *Attorney, Agent, or Firm* — Prol Intellectual Property Law, PLLC; H. Kenneth Prol

(57) ABSTRACT

A carbon dioxide (CO2) emissions state transition prediction system executing on a unified endpoint management platform information handling system may comprise a network interface device to receive operational telemetry measurements for a first client device during routine monitoring intervals, including a determined CO2 emissions value, and a non-eco-friendly state transition threshold determined for the first client device, a hardware processor to predict, via a neural network modeling relationships between changes in CO2 emissions values over a most recent monitoring period and changes in user-adjustable operational telemetry measurements over a prior monitoring period, that a future determined CO2 emissions value for the first client information handling system determined based on operational telemetry measurements recorded during the current routine monitoring interval will exceed the non-eco-friendly state transition threshold value, and the network interface device to transmit an indication for user display that the first client device is predicted to reach a non-eco-friendly state.

20 Claims, 6 Drawing Sheets

(51) Int. Cl.
*G06F 11/30* (2006.01)
*G06N 3/08* (2023.01)

(56) References Cited

U.S. PATENT DOCUMENTS

| | | | |
|---|---|---|---|
| 8,626,450 | B2 | 1/2014 | Dooley |
| 8,904,374 | B2 | 12/2014 | Nakamura |
| 9,760,474 | B2 | 9/2017 | Pillai |
| 10,146,286 | B2 | 12/2018 | Lee |
| 10,254,808 | B2 | 4/2019 | Messick |
| 10,289,184 | B2 | 5/2019 | Malik |
| 10,429,921 | B2 | 10/2019 | Potlapally |
| 10,705,786 | B2 | 7/2020 | Liu |
| 10,803,405 | B1 | 10/2020 | Levchuk |
| 10,938,954 | B2 | 3/2021 | Lee |
| 10,977,293 | B2 | 4/2021 | Cai |
| 11,009,938 | B1 | 5/2021 | Law |
| 2009/0292617 | A1 | 11/2009 | Sperling |
| 2010/0070404 | A1 | 3/2010 | McConnell |
| 2011/0112698 | A1* | 5/2011 | Edwards ............... G05B 17/02 700/291 |
| 2012/0083938 | A1* | 4/2012 | Takagi ................... H02J 3/14 700/286 |
| 2014/0100937 | A1 | 4/2014 | Na |
| 2014/0316964 | A1 | 10/2014 | Slutsker |
| 2017/0123857 | A1 | 5/2017 | Khan |
| 2019/0349321 | A1 | 11/2019 | Cai |
| 2021/0004328 | A1 | 1/2021 | Wang |
| 2021/0216978 | A1* | 7/2021 | Diaz .................... G06Q 20/123 |
| 2021/0373638 | A1 | 12/2021 | Schluessler |
| 2022/0108252 | A1* | 4/2022 | Narasimhan ........... G06Q 10/30 |

OTHER PUBLICATIONS

C. Herrmann, et al., "Sustainability as Strategic Business Model for Profitable Business," 6 pages, May 2014.

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

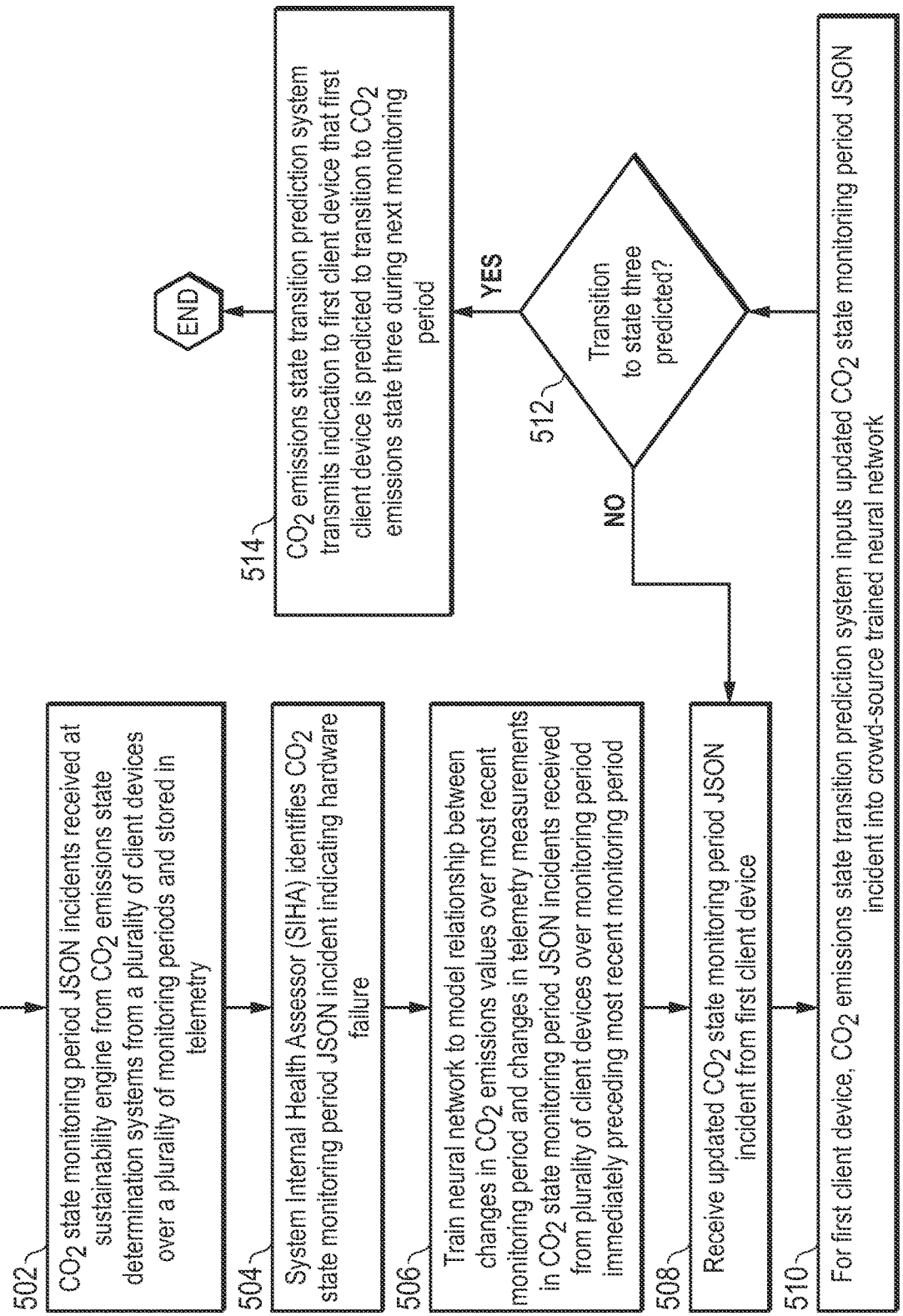

US 12,493,063 B2

SYSTEM AND METHOD FOR PREDICTING INCREASE IN GREENHOUSE GAS EMISSIONS DURING OPERATION OF CLIENT INFORMATION HANDLING SYSTEM OVER DEVICE LIFE CYCLE

FIELD OF THE DISCLOSURE

The present disclosure generally relates to determining an amount of greenhouse gas emissions that may be attributable to operation of an information handling system based on age of the device. More specifically, the present disclosure relates to a carbon dioxide ($CO_2$) emissions state transition prediction system for predicting $CO_2$ emissions due to inefficient operation of a client information handling system that accounts for the age of the device over the entire lifecycle of the client information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flow diagram illustrating a method of predicting an information handling system transition to a non-eco-friendly $CO_2$ emissions state according to an embodiment of the present disclosure.

The use of the same reference symbols in different drawings may indicate similar or identical items.

DETAILED DESCRIPTION OF THE DRAWINGS

Figure 1A:
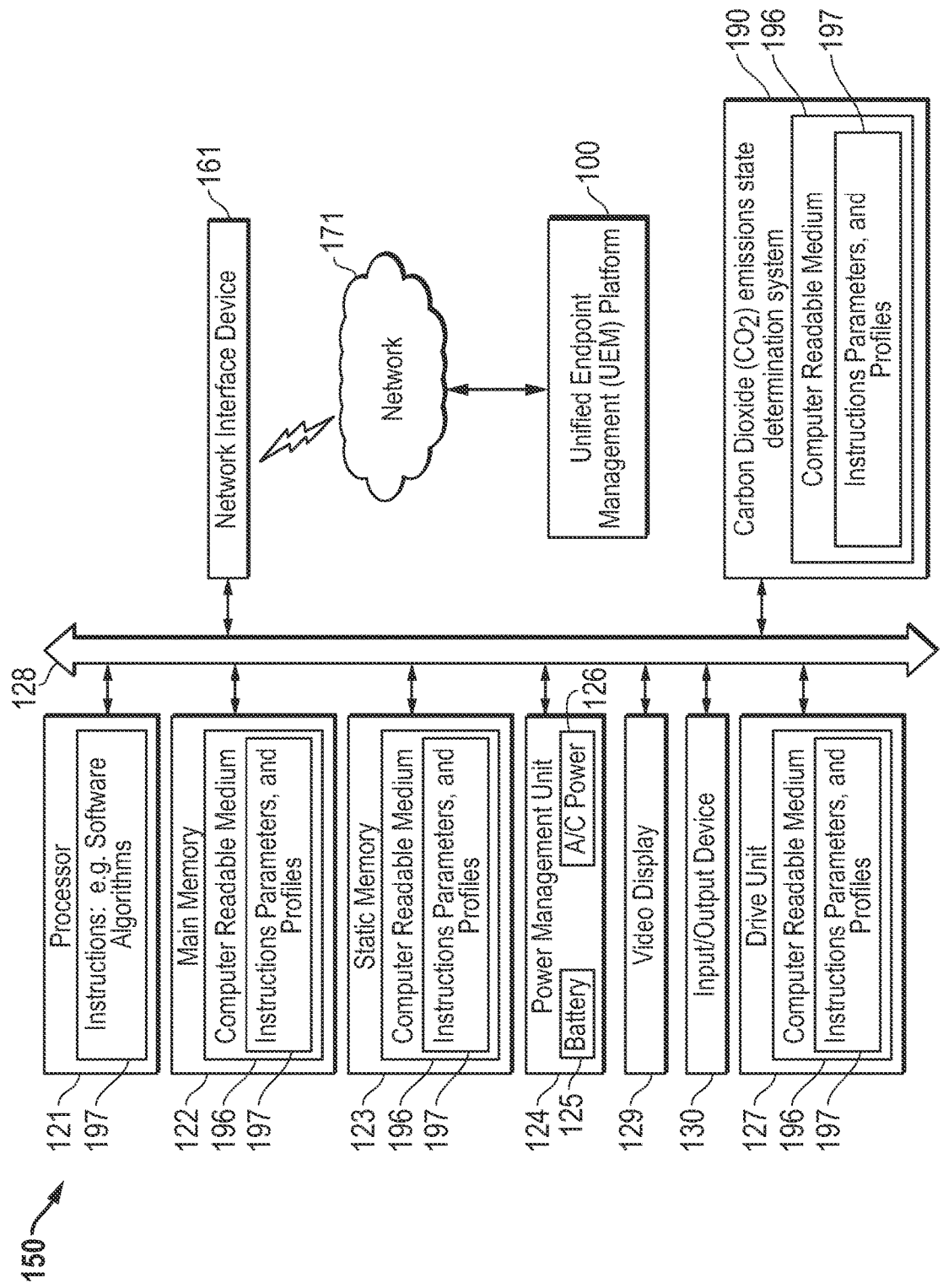
FIG. 1A is a block diagram illustrating a client information handling system in communication with a cloud-based unified endpoint management (UEM) platform according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is efficiency of device operation, including software application execution, hardware operation, and power consumption at end devices such as information handling systems operated by an end user. This efficiency measure may decrease when client information handling systems are used inefficiently or poorly maintained by a user (e.g., failure to update software or firmware, constant execution of background applications, high workload, maintaining multiple browsing sessions simultaneously, hardware components set to high performance mode rather than eco-friendly mode). These circumstances may be avoidable through warnings or recommendations provided to the user. However, this efficiency measure may also decrease as the client information handling system ages, due to unavoidable wear and tear on components. The carbon dioxide ($CO_2$) emissions state determination system operating at a client information handling system in embodiments of the present disclosure address this issue by setting goals for capping $CO_2$ emissions due to operation of each client information handling system that takes the age of the device and its components into account.

In various embodiments described herein, the life cycle of each client information handling system may be divided into three states. These states include a first, peak-health training state, immediately following initial purchase and use of the device, a monitoring second state in which the client information handling system consistently meets the goal for capping $CO_2$ emissions, and a non-eco-friendly third state in which inefficient operation of the device unrelated to age causes the client information handling system to fail to meet that goal. Each of the threshold $CO_2$ emissions values defining these states may be unique to each client information handling system and may take into account the age of each device. For example, the first state may be defined by a maximum value of pounds of $CO_2$ emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device. This first state threshold maximum value of pounds of $CO_2$ emitted per hour may provide a benchmark against which future efficiency of the client information handling system may be measured.

As described above, some decrease in operational efficiency at each client information handling system is unavoidable due to wear and tear of components, such as, for example, the battery. Thus, the $CO_2$ emitted per hour is expected to increase over time, even when the client device is being used as efficiently as possible, due to decreased efficiency of the battery as it ages. In other words, even if the updating and execution of software and firmware and power consumption of various components are optimized for minimizing $CO_2$ emissions, increases in $CO_2$ emissions during operation of the client information handling system will still occur. The $CO_2$ emissions state determination system in embodiments of the present disclosure differentiates such unavoidable increases in $CO_2$ emissions due to aging from further increases in $CO_2$ emissions due to avoidable inefficient usage of the client information handling system (e.g., due to failure to perform updates, non-optimized execution of software or firmware, or non-eco-friendly power consumption by hardware components).

The second state in embodiments of the present disclosure defines a maximum $CO_2$ emissions value for the client information handling system when the device is being used as efficiently as possible, but that also takes into account the age of the client information handling system and its components (e.g., battery). This maximum $CO_2$ emissions value defining the second state in embodiments may be referred to herein as a non-eco-friendly state transition threshold value, before transition to a third-non-eco-friendly state. For example, the non-eco-friendly state transition threshold value in embodiments may be determined by weighting the threshold maximum $CO_2$ emissions value defining the first state (e.g., in which the client information handling system is assumed to be operating at peak efficiency, optimized to minimize $CO_2$ emissions) by a decrease in efficiency of the battery due to age. In other words, the non-eco-friendly state transition threshold value in an example when the battery age has caused its efficiency to drop by 10% may be equivalent to 110% of the threshold $CO_2$ emissions value defining the first state. When operation of the client information handling system causes emission of $CO_2$ beyond this non-eco-friendly state transition threshold value, the client information handling system may pass from the second state to the third, non-eco-friendly state, in which inefficient operation of the device unrelated to age causes increased $CO_2$ emissions. In such a way, the $CO_2$ emissions state determination system may estimate $CO_2$ emissions for optimally efficient usage of the client information handling system, given the unavoidable drop in efficiency of its battery, when operating in the second state.

In other embodiments of the present disclosure, a cloud-based $CO_2$ emissions state transition prediction system may predict when the client information handling system is likely to move from the second state to the third state by increasing $CO_2$ emissions beyond the non-eco-friendly state transition threshold value described above, due to inefficiencies not related to age. The $CO_2$ emissions state transition prediction system in embodiments may notify the user of the client information handling system of such a predicted upcoming transition to the third state. Operational telemetries, including power analytics, software application analytics, and event viewer error logs, as well as determined $CO_2$ emissions values and state transition threshold values unique to each client information handling system may be gathered during routine monitoring periods from a plurality of client information handling systems at the cloud-based $CO_2$ emissions state transition prediction system. Using these crowd-sourced operational telemetry measurements from a plurality of client information handling systems, and $CO_2$ emissions values, the cloud-based $CO_2$ emissions state transition prediction system in embodiments may train a feed-forward neural network to model a relationship between changes in $CO_2$ emissions values and changes in operational telemetry measurements. In a particular embodiment, this modelled relationship between $CO_2$ emissions and changes in operational telemetry may be conducted with respect to client information handling systems having similar usage profiles or usage purposes for client information handling systems.

The cloud-based $CO_2$ emissions state transition prediction system in various embodiments may then use this modeled relationship to identify one or more changes in power measurements, software analytics measurements, or error log events that could cause an individual client information handling system to cross from the second state to the non-eco-friendly third state. For example, the cloud-based $CO_2$ emissions state transition prediction system in embodiments may predict that failure of a specifically identified hardware component, increased power consumption by a specific hardware component, high workload by a specific software application, failure to perform a critical update to firmware, or continued uncapped usage of background software applications may cause a future transition from the second state to the third state at a particular client information handling system. As an example, the cloud-based $CO_2$ emissions state transition prediction system may input operational telemetry measurements from an individual client information handling system into the trained neural network, generate an error function based on the received non-eco-friendly state transition threshold value for that client information handling system, and back-propagate to determine one or more causative changes in operational telemetry measurements that may be likely to cause a future $CO_2$ emissions value for that client information handling system to exceed its particular non-eco-friendly state transition threshold value.

The $CO_2$ emissions state transition prediction system in embodiments may also operate to warn or notify a user of a client information handling system that continued inefficient usage of the client information handling system is predicted to cause an imminent transition from the second state to the non-eco-friendly third state. Upon identification of one or more causative changes in operational telemetry measurements (e.g., failure of a specifically identified hardware component, increased power consumption by a specific hardware component, high workload by a specific software application, failure to perform a critical update to firmware, or continued uncapped usage of background software applications) that may cause a client information handling system to transition from the second state to the non-eco-friendly third state (e.g., by causing $CO_2$ emissions exceeding the non-eco-friendly state transition threshold value for that specific client information handling system), the $CO_2$ emissions state transition prediction system in embodiments may monitor updated operational telemetry measurements for indications that such a causative change in operational telemetry measurements has occurred. The CO2 emissions state transition prediction system may transmit an instruction to notify a user (e.g., via a graphical user interface (GUI)) at the client information handling system that the client information handling system is predicted to transition from the second state to the non-eco-friendly third state during the next monitoring period. In such a way, the cloud-based CO2 emissions state transition prediction system may predict and notify a user when the client information handling system is likely to move from the second state to the third state due to increasing CO2 emissions beyond the non-eco-friendly state transition threshold value attributable to inefficiencies not related to age.

FIG. 1A illustrates an information handling system 150 according to several aspects of the present disclosure. As described herein, the carbon dioxide (CO2) emissions state determination system 190 operating at a client information handling system 150 in an embodiment may set goals for capping CO2 emissions due to operation of each client information handling system (e.g., 150) that takes the age of the device 150 and its components (e.g., battery 125) into account. Some decrease in operational efficiency at each client information handling system (e.g., 150) is unavoidable due to wear and tear of components (e.g., battery 125). The CO2 emissions state transition prediction system 190 in an embodiment may differentiate such unavoidable increases in CO2 emissions due to aging from further increases in CO2 emissions due to avoidable inefficient usage of the client information handling system 150 (e.g., due to failure to perform updates, non-optimized execution of software or firmware, or non-eco-friendly power consumption by hardware components). Each of a plurality of individual client information handling system (e.g., 150) may communicate with a CO2 emissions state transition prediction system operating at a cloud-based Unified Endpoint Management (UEM) platform 100 via network 171, as described in greater detail below and with respect to FIG. 1B.

In particular, in the embodiments described herein, an information handling system 150 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 150 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 150 may operate in the capacity of a server or as a client computer in a server-client network environment, or as a peer computer system in a peer-to-peer (or distributed) network environment. In a particular embodiment, the information handling system 150 may be implemented using electronic devices that provide voice, video or data communication. Further, while a single information handling system 150 is illustrated, the term "system" shall also be taken to include any collection of systems or sub-systems that individually or jointly execute a set, or multiple sets, of instructions to perform one or more computer functions.

The information handling system 150 may include a memory 122, (with computer readable medium 196 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 121 illustrated in FIG. 1A, hardware control logic, or any combination thereof. Additional components of the information handling system 150 may include one or more storage devices 123 or 127, a wireless network interface device 161, one or more communications ports for communicating with external devices, as well as various input and output (I/O) devices 130, such as a keyboard, a mouse, touchpad or any combination thereof. A power management unit 124 supplying power to the information handling system 150, via a battery 125 or an alternating current (A/C) power adapter 126 may supply power to one or more components of the information handling system 150, including the hardware processor 121 or other hardware processing resources executing code instructions of the CO2 emissions state determination system 190, the wireless network interface device 161, a static memory 123 or drive unit 127, a video display 129 or other components of an information handling system. The video display 129 in an embodiment may function as a liquid crystal display (LCD), an organic light emitting diode (OLED), a flat panel display, or a solid-state display. The information handling system 150 may also include one or more buses (e.g., 128) operable to transmit communications between the various hardware components. Portions of an information handling system 150 may themselves be considered information handling systems 150 in the embodiments presented herein.

Information handling system 150 may include devices or modules that embody one or more of the devices or execute instructions for the one or more systems and modules described herein, and operates to perform one or more of the methods described herein. The information handling system 150 may execute code instructions 197, via one or more hardware processing resources, such as for the CO2 emissions state determination system 190 that may operate on servers or systems, remote data centers, or on-box in individual client information handling systems 150 according to various embodiments herein. In some embodiments, it is understood any or all portions of code instructions 197 may operate on a plurality of information handling systems 150.

The information handling system 150 may include a hardware processor 121 such as a central processing unit (CPU), a graphics processing unit (GPU), a Visual Processing Unit (VPU), or a hardware accelerator, embedded hardware controllers or hardware control logic or some combination of the same. Any of the hardware processing resources may operate to execute code that is either firmware or software code. Moreover, the information handling system 150 may include memory such as main memory 122, static memory 123, containing computer readable medium 196 storing instructions 197. In some embodiments, information handling system 150, or portions thereof, may represent a client information handling system operating various hardware components (e.g., hardware processor 121, memory 122, network interface device 161, power management unit 124) in need of occasional replacement, and executing an agent of the CO2 emissions state determination system 190, as described in greater detail below with respect to FIG. 2. In other embodiments the information handling system 150 may represent a server information handling system a CO2 emissions state determination system 190, operating system (OS) software, application software, BIOS software, or other software applications or drivers detectable by hardware processor 121 or other hardware processing resource type.

The disk drive unit 127 and static memory 123 may also contain space for data storage in a computer readable medium 196. The instructions 197 in an embodiment may reside completely, or at least partially, within the main memory 122, the static memory 123, and/or within the disk drive 127 during execution by the hardware processor 121. The information handling system 150 may also include one or more buses 128 operable to transmit communications between the various hardware components such as any combination of various input and output (I/O) devices 130, or the like.

The network interface device 161 may provide connectivity of the information handling system 150 to the network 171 via a dedicated link, a network AP or base station in an embodiment. The network 171 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 171 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 171, one or more APs for those networks, or to a docking station in an embodiment may be via wired or wireless connection. In some aspects of the present disclosure, the network interface device 161 may operate two or more wireless links. In other aspects of the present disclosure, the information handling system 150 may include a plurality of network interface devices, each capable of establishing a separate wireless link to network 171, such that the information handling system 150 may be in communication with network 171 via a plurality of wireless links.

The network interface device 161 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 161, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 161 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 197 or receives and executes instructions, parameters, and profiles 197 responsive to a propagated signal, so that a device connected to a network 171 may communicate voice, video or data over the network 171. Further, the instructions 197 may be transmitted or received over the network 171 via the network interface device 161. The information handling system 150 may include a set of instructions 197 that may be executed to cause the computer system to perform any one or more of the methods or computer-based functions disclosed herein, such as estimating CO2 emissions for optimally efficient usage of the client information handling system 150, given the unavoidable drop in efficiency due to aging of particular hardware components (e.g., battery 125). For example, instructions 197 may include a particular example of a CO2 emissions state determination system 190, or other aspects or components. Various software modules comprising application instructions 197 may be coordinated by an operating system (OS), and/or via an application programming interface (API). An example operating system may include Windows®, Android®, and other OS types. Example APIs may include Win 32, Core Java API, or Android APIs. Application instructions 197 may also include any application processing drivers, or the like executing on hardware processing resources of information handling system 150.

The CO2 emissions state determination system 190 may utilize a computer-readable medium 196 in which one or more sets of instructions 197 may operate in part as software or firmware instructions executed by hardware processing resources of the information handling system 150. The instructions 197 may embody one or more of the methods or logic as described herein. For example, instructions relating to the CO2 emissions state determination system 190, firmware or software algorithms, processes, and/or methods may be stored here. Such instructions 197 may comprise a system estimating CO2 emissions for optimally efficient usage of the client information handling system 150, given the unavoidable drop in efficiency due to aging of particular hardware components (e.g., battery 125). The CO2 emissions state determination system 190 may communicate with a Unified Endpoint Management (UEM) platform 100 that gathers operational telemetry measurements from a plurality of client information handling systems (e.g., 150) endpoints via the network 171 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The information handling system 150 in an embodiment may depict a client information handling system that reports to a UEM 100 and receives recommendations from the UEM 100 pursuant to various embodiments described herein.

Main memory 122 may contain computer-readable medium (not shown), such as RAM in an example embodiment. An example of main memory 122 includes random access memory (RAM) such as static RAM (SRAM), dynamic RAM (DRAM), non-volatile RAM (NV-RAM), or the like, read only memory (ROM), another type of memory, or a combination thereof. Static memory 123 may contain computer-readable medium (not shown), such as NOR or NAND flash memory in some example embodiments. The instructions, parameters, and profiles 197 of the CO2 emissions state determination system 190 may be stored in static memory 123, or the drive unit 127 on a computer-readable medium 196 such as a flash memory or magnetic disk in an example embodiment. More specifically, telemetries describing power consumption of various hardware components, analytics for executing firmware or software applications, and errors associated with one or more hardware components of client information handling systems (e.g., 150) may be stored within memory 122, static memory 123, or drive unit 127.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

Figure 1B:
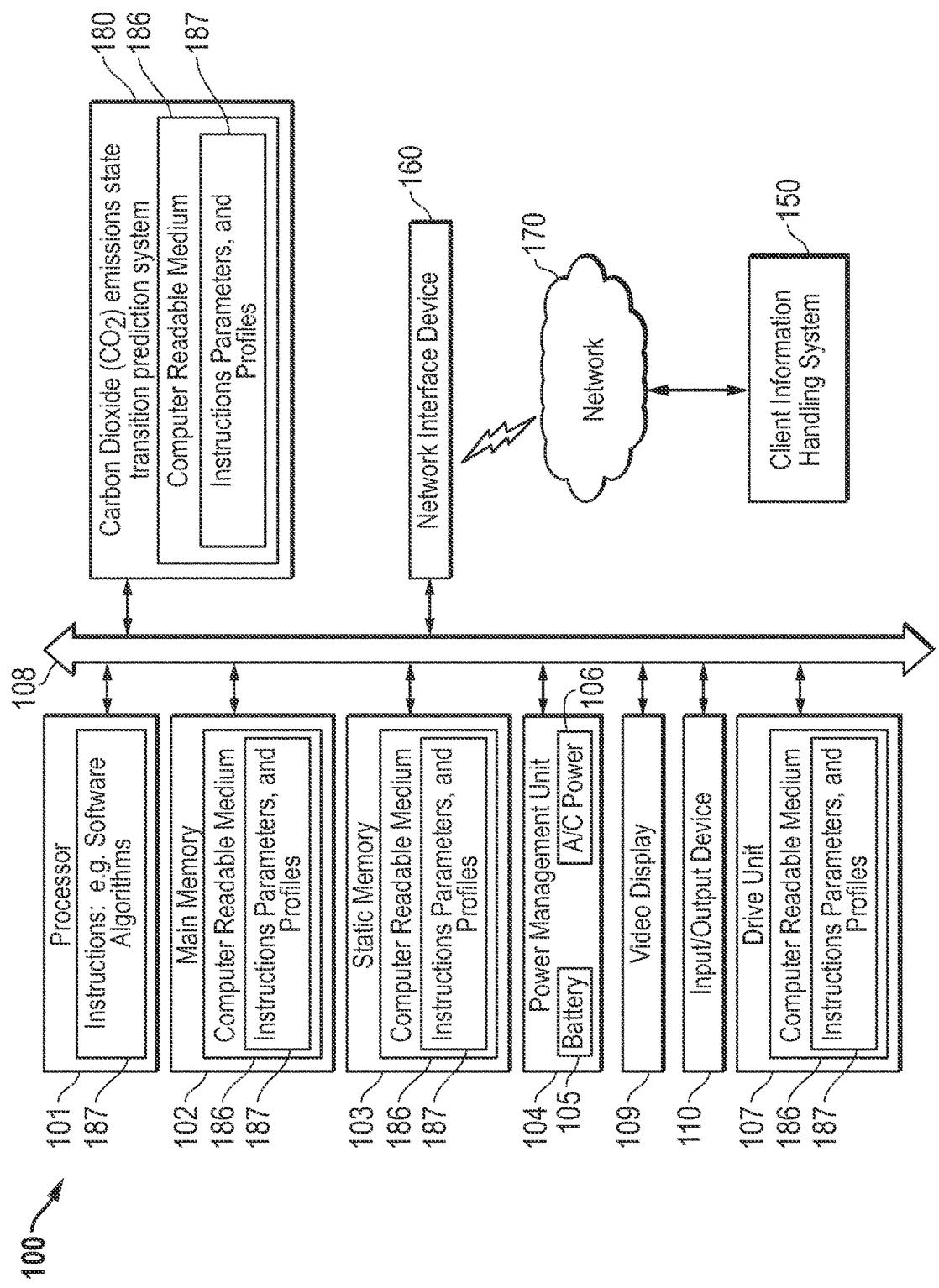
FIG. 1B is a block diagram illustrating a cloud-based UEM platform information handling system according to an embodiment of the present disclosure.

When referred to as a "system", a "device," a "module," a "controller," or the like, the embodiments described herein may be configured as hardware, or software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may execute software, including firmware embedded at a device, such as an Intel® Core class hardware processor, ARM® brand hardware processors, Qualcomm @Snapdragon hardware processors, or other hardware processors and chipsets, or other such device, or software capable of operating a relevant environment of the information handling system. The system, device, controller, or module may also comprise a combination of the foregoing examples of hardware, firmware, or software. In an embodiment an information handling system 150 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communica- FIG. 1B illustrates an information handling system 100 according to several aspects of the present disclosure. As described herein, a cloud-based CO2 emissions state transition prediction system 180 may predict when a client information handling system (e.g., 150) is likely to move into a non-eco-friendly third state by increasing CO2 emissions beyond the non-eco-friendly state transition threshold value determined by the CO2 emissions state determination system at that client information handling system 150 (e.g., as described above with respect to FIG. 1A), due to inefficiencies not related to age of the client information handling system (e.g., 150) or its various hardware components. Operational telemetry measurements, including power analytics, software application analytics, and event viewer error logs, as well as determined CO2 emissions values and state transition threshold values particular to each client information handling systems (e.g., 150) may be gathered during routine monitoring periods from a plurality of client information handling systems (e.g., 150) at the UEM platform 100 executing the cloud-based CO2 emissions state transition prediction system 180.

Using these crowd-sourced operational telemetry measurements from a plurality of client information handling systems (e.g., 150), and CO2 emissions values, the cloud-based CO2 emissions state transition prediction system 180 executing on a hardware processor 101 in embodiments herein may train a feed-forward neural network to model a relationship between changes in CO2 emissions values and changes in operational telemetry measurements. The UEM platform 100 executing code instructions of the cloud-based CO2 emissions state transition prediction system 100 via a hardware processor 101 in various embodiments may then use this modeled relationship to identify one or more changes in power measurements, software analytics measurements, or error log events that could cause an individual client information handling system (e.g., 150) to cross from the second state to the non-eco-friendly third state. The cloud-based CO2 emissions state transition prediction system 180 operating at the UEM platform 100 in an embodiment may predict and notify a user when the client information handling system (e.g., 150) is likely to move from the second state to the third non-eco-friendly state due to increasing CO2 emissions beyond the non-eco-friendly state transition threshold value attributable to inefficiencies not related to age of the client information handling system 150.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1B, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the CO2 emissions state transition prediction system 180, the wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the CO2 emissions state transition prediction system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system a CO2 emissions state transition prediction system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as predicting, based on operational telemetry measurements from a plurality of client information handling systems (e.g., 150), that a client information handling system (e.g., 150) may transition from a CO2 emissions state two which is eco-friendly to a non-eco-friendly CO2 emissions state three during a current monitoring period. For example, instructions 187 may include a particular example of a CO2 emissions state transition prediction system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The CO2 emissions state transition prediction system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the CO2 emissions state transition prediction system 180, firmware or software algorithms, processes, and/or methods may be stored here. Such code instructions 187 may comprise predicting and notifying a user when the client information handling system (e.g., 150) is likely to move from the second state to the third non-eco-friendly state by increasing CO2 emissions beyond the non-eco-friendly state transition threshold value due to inefficiencies not related to age of the client information handling system 150. The CO2 emissions state transition prediction system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the CO2 emissions state transition prediction system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

Figure 2:
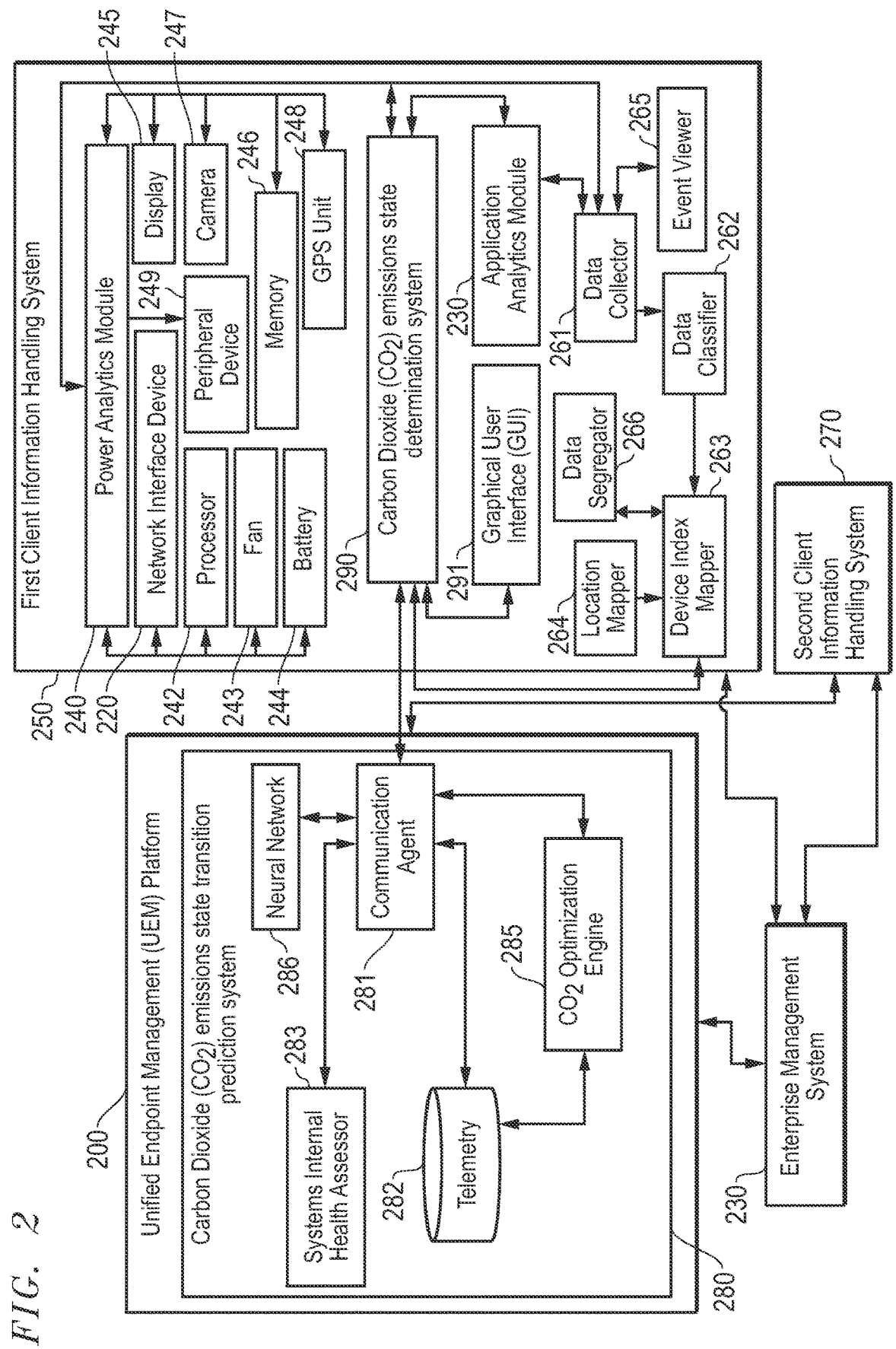
FIG. 2 is a block diagram illustrating a carbon dioxide ($CO_2$) emissions state transition prediction system in communication with a client information handling system according to an embodiment of the present disclosure.

FIG. 2 is a block diagram illustrating a carbon dioxide (CO2) emissions state transition prediction system 280 for predicting and notifying a user that inefficient operation of a client information handling system 250 will cause emission of CO2 due to such operation to exceed a non-eco-friendly state transition threshold value determined by the CO2 emissions state determination system 290 of the client information handling system 250 based on the age of the client device 250 or components therein according to an embodiment of the present disclosure. A unified endpoint management (UEM) platform 200 in an embodiment may execute a CO2 emissions state transition prediction system 280 to predict an upcoming transition to a non-eco-friendly operational state for one of a plurality of client information handling systems (e.g., 250) under management of or in communication with an enterprise management system 230, which may act as an interface between the client information handling system (e.g., 250 or 270) and the UEM platform 200.

The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather operational telemetry measurements from a plurality of client information handling systems (e.g., 250 and 270) that describe operating environments for those client information handling systems (e.g., power consumption analytics, failures or errors associated with one or more hardware components, or analytics for software usage).

A CO2 emissions state transition prediction system 280 in an embodiment may train a neural network 286 to model a relationship between changes in CO2 emissions values and changes in various operational telemetry measurements (e.g., power analytics, software analytics, error log events) to predict the degree to which certain changes in operational efficiency of client information handling systems (e.g., 250 or 270) may increase CO2 emitted during such operation. These changes in operational efficiency in an embodiment may be represented by the various operational telemetry measurements, such as power analytics, software application analytics, and event viewer log entries. The UEM platform 200 may receive such operational telemetry measurements upon which such predictions may be made from a plurality of client information handling systems (e.g., 250 and 270), which may be managed by the same enterprise management system (e.g., 230), or may be managed by separate enterprise management systems in various embodiments.

Each client information handling system (e.g., 250 or 270) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a display 245, a memory 246, a fan 243, and one or more components of a power supply unit (e.g., battery 244). In some embodiments, the first client information handling system 250 may further include one or more sensing devices, such as a location sensing devices 248 (e.g., GPS location unit), a peripheral device 249, or camera 247, which may also be used during execution of videoconferencing software applications, for example. In another embodiment, the first client information handling system 250 may further be operably connected to one or more peripheral devices, for example. Such an operably connection may employ a driver or firmware for such a peripheral device in such an embodiment. One or more of the other hardware components described herein (e.g., 220, 242, 243, 244, 245, 246, 247, 248, or 249) may further operate according to firmware or driver instructions in an embodiment.

A power analytics module 240 in an embodiment may be in communication with the various hardware components (e.g., 220, 242, 243, 244, 245, 246, 247, 248, or 249) and firmware for those components in an embodiment. For example, the power analytics module 240 may monitor power consumption by each of the various hardware components (e.g., 220, 242, 243, 244, 245, 246, 247, 248, or 249) in an embodiment. In another example embodiment, the power analytics module 240 may also access firmware for hardware components (e.g., 220, 242, 243, 244, 245, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage as a percentage of total capacity for the hardware processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the location sensing device (e.g., GPS unit) 248, peripheral device 249, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN, WWAN, or in RDP, or reset policies for the network interface device 220 to restrict remote calls, operation as a mirror server, power consumption, data rate, or frequencies used. In another example, the power analytics module 240 in an embodiment may adjust the usage mode for the display 245 to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 247 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 242, 243, 244, 245, 246, 247, 248, or 249). In still other embodiments, the power analytics module 240 may further determine power consumed during updates made to various firmware or software applications executing via the hardware processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. In yet another example, the applications analytics module 230 may determine a number of browsing windows engaged in active sessions, and a time of such active engagement. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the hardware processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the hardware processor 242 or memory 246 that may be used by idle or background applications. In yet another example, the application analytics module 230 may cap the amount of time per day that a browsing software application (e.g., Google® Chrome®, Firefox®) maintains active sessions, or capping a number of active windows within such browsing software applications.

As described herein, the data collector module 261 in an embodiment may gather data regarding hardware configuration and power consumption from the power analytics module 240 and data regarding software performance and hardware processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 242, 243, 244, 245, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., failure of a hardware component such as the fan 243). In other cases, a JSON event may include routinely gathered information such as current configurations or policies for various hardware components (e.g., 220, 242, 243, 244, 245, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1544145336 |
| Client Device ID | 456789 |
| Event ID | 123456 |
| Errors, notifications, warnings | Fan operating at 20 W<br>Fan workload at 90%<br>Gaming application initialization Unsuccessful |
| Location | Dallas, TX |
| Model | Laptop 7400 |
| Hardware Configuration | WLAN network interface device;<br>WWAN network interface device;<br>Bluetooth ® network interface device;<br>16 GB memory;<br>X series CPU;<br>G Series GPU;<br>256 GB Solid State Drive (SSD);<br>15.6 inch full high definition (HD) organic light emitting diode (OLED) display;<br>Fan driver version 14.2;<br>Webcam Camera type; |
| Hardware Performance | WWAN Interface Device transceived 100 GB;<br>Battery efficiency 100%;<br>Display in High Definition Mode;<br>Motion Detector Set to Continuous Monitor;<br>Camera in High Resolution Mode;<br>System used eight hours per day;<br>84 Watts total power consumption per day; |
| Software Performance | Operating System 10.2;<br>Browsing application active eight hours per day; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data":
  {
    "event_id": 123456,
    "source_ID" : power_analytics_module,
    "timestamp_unixtime_ms" : 1544145336,
    "custom_flags" :
      {
        "fan_workload" : 0.90,
        "Unsuccessful_initialization_attempt":gaming_app,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
```

-continued

```
        "fan_driver_version":14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 1.0,
        "usage_time_hours_perday" : 8,
        "fan_power_consumption_watts" : 20,
        "total_power_consumption_watts_perday" : 84,
        "active_browsing_hours_perday" : 8;
      }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Some JSON events in an embodiment may indicate a hardware failure, such as a JSON event named "WHEA_error," having a value of fan, indicating a failure at the fan. In embodiments where a JSON event indicating a hardware error identifying by the systems internal health assessor (as described below and with respect to FIG. 5 at block 504) appear, the JSON incident may comprise one or more operational telemetry measurements for an information handling system. Upon reformatting of information in an embodiment, the data collector 261 may transmit the JSON incident comprising the operational telemetry measurements to the data classifier 262. In an embodiment, the data classifier 262 may operate to analyze the contents of the JSON incident comprising the operational telemetry measurements, to classify the type of JSON events included therewithin, and to edit the JSON incident to generate a second JSON incident that includes that classification type.

Classification types may be preset according to instructions received by the CO2 emissions state determination system 290 from the communication agent 281. Such classification types may assist the communication agent 281 and systems internal health assessor 283 in determining when a hardware failure impacting CO2 emissions state for the client information handling system 250 has occurred, or will occur in the immediate future, as described in greater detail below. In example embodiments, classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the CO2 emissions state transition prediction system 280 with JSON events titled "fan_workload" having a value exceeding 85%. In another example, an incident classification for "Config," identifying a hardware configuration or policy that may result in various hardware component failures in an embodiment may be associated with JSON events titled "Config," having a value such as "active_browsing_hours_perday" having a value above 10, "server_mirroring" having a value "ON," "remote_desktop_protocol" having a value "ON," "remote_processor_calls" having a value "ALLOW," "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident comprising operational telemetry measurements described above to identify whether any of the JSON events and values associated with preset incident classifiers appear within the JSON incident. For example, the data classifier 262 in an embodiment may determine the JSON incident comprising operational telemetry measurements described above includes the JSON event named "fan_workload," having a value of 0.90, or 90%, which is greater than the preset maximum fan workload of 85%. In such an embodiment, the data classifier 262 may determine these JSON events are associated with the preset incident classifier "workload," and may append this classification to the end of the JSON incident comprising operational telemetry measurements to generate a classified JSON incident comprising operational telemetry measurements:

```
{
  "incident_class" : Workload,
}
```

In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

```
}
  "incident_class" : Workload,
  "incident_class" : Driver_perf,
  "incident_class" : Config,
}
```

The classified JSON incident comprising operational telemetry in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 248. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident comprising operational telemetry measurements to generate an indexed and classified JSON incident comprising operational telemetry measurements that includes this information, such as shown directly below, which is then transmitted to the CO2 emissions state determination system 290:

```
{
  "data":
  {
    "event_id": 123456,
    "source_ID" : power_analytics_module,
    "timestamp_unixtime_ms" : 1544145336,
    "client_device_ID" : 456789,
    "client_device_model" : Laptop_7400,
    "location" : Paris_France,
    "custom_flags" :
    {
      "fan_workload" : 0.90,
      "Unsuccessful_initialization_attempt":gaming_app,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version":14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "efficiency_battery" : 1.0,
      "usage_time_hours_perday" : 8,
      "fan_power_consumption_watts" : 20,
      "total_power_consumption_watts_perday" : 84,
      "active_browsing_hours_perday" : 8;
    }
  }
  "incident_class" : Workload,
}
```

The CO2 emissions state determination system 290 in an embodiment may determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, and the efficiency of the battery, as shown in the indexed and classified JSON incident.

The location of the client information handling system may define an estimated amount of CO2 (in pounds per kWh) emitted during generation of the power consumed by the client information handling system. Carbon footprint for a client information handling system (e.g., 250 or 270) in an embodiment may be based on the power consumed by the client information handling system (e.g., 250 or 270), the duration of such consumption, and a location CO2 emissions rate describing the amount of CO2 or other GHGs emitted during generation of each Watt of power consumed by the client information handling system (e.g., 250 or 270). In embodiments, the CO2 emissions state determination system 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the CO2 emissions state determination system 290 may communicate with the CO2 optimization engine 285 or telemetry 282 to determine the location CO2 emissions rate describing the amount of CO2 of other GHGs emitted during generation of each Watt of power consumed by the client information handling system 250 in Paris, France (e.g., the location of the client information handling system 250 as shown in the indexed and classified JSON incident) to be 0.136 pounds CO2 per kWh.

In an example embodiment, the CO2 emissions value may be determined using the equation below to determine the CO2 emissions value for the client information handling system 250 operating in Paris, France, where the location CO2 emissions rate is 0.136 pounds CO2 per kWh, the power consumed is 84 Watts over a usage time of 8 hours at a battery efficiency of 100% is equivalent to 0.091 pounds CO2 per day:

$$\text{CO2 Emissions Value} = \frac{\text{location CO2 emissions rate} * \text{Power Consumed} * \text{Usage Time}}{\text{Battery Efficiency}}$$

The CO2 emissions state determination system in an embodiment may perform this determination of CO2 emissions value for each indexed and classified JSON incident it receives from the device index mapper 263 over the CO2 emissions state determination training period. Following such a determination, the CO2 emissions state determination system 290 may append one or more JSON events indicating the CO2 emissions value within the indexed and classified JSON incident most recently received from the device index mapper 263 and upon which such a determination was made.

As described herein, the carbon dioxide (CO2) emissions state determination system 290 executing on hardware processing resources at a client information handling system 250 in an embodiment may set goals for capping CO2 emissions due to operation of the client information handling system 250 that takes the age of the device and its components into account. In an embodiment, the life cycle of each client information handling system (e.g., 250) may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be unique to each client information handling system and may be established to take into account the age of each device. For example, the first state may be defined by a maximum value of pounds of CO2 emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device. For example, in an embodiment in which the CO2 emissions state determination system uses the indexed and classified JSON incident shown above to determine the maximum recorded CO2 emissions value during the training period, the CO2 emissions state determination system may define the maximum CO2 emissions value for the training period to be 0.091 pounds CO2 per day. This first state threshold maximum value of pounds of CO2 emitted per hour may provide an initial benchmark against which future efficiency of the client information handling system may be measured.

As described above, some decrease in operational efficiency at each client information handling system is unavoidable due to wear and tear of components, such as, for example, the battery. Thus, the CO2 emitted per hour is expected to increase over time to an adjustable benchmark, even when the client device is being used as efficiently as possible, due to decreased efficiency of the battery as it ages. In other words, even if the updating and execution of software and firmware and power consumption of various components are optimized for minimizing CO2 emissions, increases in CO2 emissions during operation of the client information handling system will still occur. The CO2 emissions state transition prediction system in embodiments of the present disclosure differentiates such unavoidable increases in CO2 emissions due to aging from further increases in CO2 emissions due to avoidable inefficient usage of the client information handling system (e.g., due to failure to perform updates, non-optimized execution of software or firmware, or non-eco-friendly power consumption by hardware components).

As described further in FIG. 4 below, the CO2 emissions state determination system may determine a minimum allowable battery efficiency prior to prompting replacement of the battery in an embodiment. These values may be used below to define the boundary between CO2 emissions state two and state three. The CO2 emissions state determination system 290 in an example embodiment may define this minimum allowable battery efficiency at 25%. In such an example embodiment, the CO2 emissions state determination system anticipates that the battery efficiency may degrade down to 25% before the battery will be replaced.

The CO2 emissions state determination system in an embodiment may determine a CO2 emissions state three transition threshold value based on the state two transition threshold value and a minimum allowable battery efficiency, as described in greater detail below with respect to FIG. 4. The CO2 emissions state determination system may determine a minimum allowable battery efficiency prior to prompting replacement of the battery in an embodiment. These values may be used below to define the boundary between CO2 emissions state two and state three. As described herein, some decrease in operational efficiency at each client information handling system (e.g., 250) is unavoidable due to wear and tear of components, such as, for example, the battery 244. Thus, the CO2 emitted per hour is expected to increase over time, even when the client device 250 is being used as efficiently as possible, due to decreased efficiency of the battery 244 as it ages. The CO2 emissions state transition determination system 290 in an embodiment differentiates such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components). For example, the CO2 emissions state determination system 290 in an embodiment may determine a CO2 emissions state three transition threshold value by dividing the CO2 emissions state two transition threshold by the minimum allowable battery efficiency. This maximum CO2 emissions value defining the second state in embodiments may be referred to herein as a non-eco-friendly state transition threshold value. When operation of the client information handling system 250 causes emission of CO2 beyond this non-eco-friendly state transition threshold value, the client information handling system 250 may pass from the second state to the third, non-eco-friendly state in which inefficient operation of the device unrelated to age causes increased CO2 emissions. In such a way, the CO2 emissions state determination system 290 may estimate CO2 emissions for optimally efficient usage of the client information handling system 250 in state two, given the unavoidable drop in efficiency of its battery.

The CO2 emissions state determination system may initiate a CO2 emissions state monitoring period following determination of the CO2 emissions states two and three transition threshold values described directly above. During this monitoring period, the CO2 emissions state determination system 290 may routinely generate CO2 determined monitoring period JSON incidents (similarly to the method used to generate a CO2 determined training period JSON incident described below with respect to FIG. 3) during a routine period of monitoring, and append the determined CO2 emissions value, CO2 emissions state two transition threshold value, and CO2 emissions state three transition threshold value to generate CO2 state monitoring period JSON incidents, as described further below in FIG. 4.

A data segregator 266 of the client information handling system 250 in an example embodiment may determine whether the client information handling system is operating within the CO2 emissions state two and may include a usage profile for the client information handling system 250 within the CO2 state monitoring period JSON incident during each monitoring period described directly above. The data segregator 266 in an embodiment may operate to narrow the number of CO2 state monitoring period JSON incidents transmitted to the CO2 emissions state predictions system 280 at the Unified Endpoint Management (UEM) platform 200 and to assist the CO2 emissions state predictions system 280 in sorting CO2 state monitoring period JSON incidents according to usage profiles.

As described herein, execution of code instructions for the CO2 emissions state predictions system 280 via hardware processing resources in an embodiment may predict when an information handling system (e.g., 250 or 270) that is currently operating in CO2 emissions state two may imminently transition to the CO2 emissions state three (non-eco-friendly state). Because the CO2 emissions state transition prediction system 280 in such an embodiment only analyzes future performance of client information handling systems (e.g., 250 or 270) currently operating within the CO2 emissions second state, only CO2 state monitoring period JSON incidents from those information handling systems (e.g., 250 or 270) currently operating in the CO2 emissions second state need be transmitted to the CO2 emissions state transition prediction system 280.

As also described herein, in some embodiments, a separate neural network may be trained for each usage profile identified by the data segregator 266 within the CO2 state monitoring period JSON incidents for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage_profile" having a value of "corporate," or any of the other above-described usage profiles or other contemplated usage profiles within the CO2 state monitoring period JSON incident. Any client usage profile categories may be utilized for various client information handling systems monitored by the UEM platform such that those with similar usage profiles may be used as inputs and as a basis for comparison. These CO2 state monitoring period JSON incidents may then be transmitted to the CO2 state transition prediction system 280 of the UEM platform 200.

The CO2 state transition prediction system 280 in an embodiment may operate to predict when a client information handling system (e.g., 250 or 270) may transition from CO2 emissions state two to CO2 emissions state three during an upcoming or current monitoring period. As described herein, a cloud-based CO2 emissions state transition prediction system 280 may predict when the client information handling system 250 is likely to move from the second state to the third state by increasing CO2 emissions beyond the non-eco-friendly state transition threshold value, due to inefficiencies not related to age.

The communication agent operating at the UEM platform in an embodiment may receive and store in telemetry CO2 state monitoring period JSON incidents from a plurality of client information handling systems over a plurality of monitoring periods. In some embodiments, a systems internal health assessor (SIHA) operating at the Unified Endpoint Management (UEM) platform may identify one or more CO2 state monitoring period JSON incidents indicating hardware failure. For example, the SIHA 283 operating at the UEM platform 200 in an embodiment may identify one or more CO2 state monitoring period JSON incidents received from the client information handling system (e.g., 250 or 270) indicating hardware failure at those devices.

The CO2 emissions state transition prediction system in an embodiment may train one or more neural networks to model relationships between changes in CO2 emissions values over a most recent monitoring period and changes in telemetry measurements in CO2 state monitoring period JSON incidents received from a plurality of client devices over the monitoring period immediately preceding the most recent monitoring period. The input layer of the neural network 286 may comprise a plurality of nodes, with each node representing a value given within a received CO2 state monitoring period JSON incident for a plurality of operational telemetry measurements that are adjustable by a user and potentially included within gathered CO2 state monitoring period JSON incidents. A list of such user-adjustable operational telemetry measurements and their associated JSON event names may be stored in telemetry 282 in an example embodiment. An output layer of the feed-forward neural network may include a predicted CO2 emissions value and a predicted CO2 emissions state for the client information handling system.

The CO2 emissions state transition prediction system 280 in an embodiment may begin training the neural network by performing a first forward propagation for an initial CO2 state monitoring period JSON incident. The CO2 emissions state transition prediction system 280 in an embodiment may generate an initial error function by comparing the actual CO2 emissions value found in a later-recorded CO2 state monitoring period JSON incident to the initial output predicted CO2 emissions value determined using the initial feed-forward of the earlier-recorded CO2 state monitoring period JSON incident. The difference between these values may be back propagated through the hidden layers of the neural network to adjust each of the associated weight arrays. By performing such a feed-forward and back-propagation method repeatedly, the neural network 286 may be trained to model a relationship between each of the user-adjustable operational telemetry measurement values indicated within the earlier-recorded CO2 state monitoring period JSON incident and the CO2 emissions state indicated within the later-recorded CO2 state monitoring period JSON incident. The CO2 emissions state transition prediction system 280 may further train the neural network 286 on other sets of received CO2 state monitoring period JSON incidents from a plurality of client information handling systems (e.g., 250 and 270) using the same frequency of monitoring periods as that used by the information handling system 250. In such a way, the CO2 emissions state transition prediction system 280 may use crowd-sourced CO2 state monitoring period JSON incidents across a plurality of client information handling systems to train the neural network 286 to model the relationship between various user-adjustable operational telemetry measurements in an earlier monitoring period and a future CO2 emissions state for a later monitoring period.

As described herein, in some embodiments, a separate neural network may be trained for each usage profile identified by the data segregator 266 within the CO2 state monitoring period JSON incidents for the plurality of client information handling systems. For example, in an embodiment in which telemetry 282 stores CO2 state monitoring period JSON incidents including usage profiles such as "corporate," "testing," "application_development," "home_use," or "gaming," a separate neural network (e.g., 286) may be trained for each of these usage profiles. In such an embodiment, for example, a neural network (e.g., 286) trained to predict when a client information handling system (e.g., 250) having a usage profile of "corporate" will transition from CO2 emissions state value two to the non-eco-friendly CO2 emissions state value three may only use CO2 state monitoring period JSON incidents crowd-sourced from other client information handling systems (e.g., 270) having a usage profile of "corporate" during the training of the neural network.

The CO2 emissions state transition prediction system in an embodiment may receive and input into the crowd-source trained neural network an updated CO2 state monitoring period JSON incident from a first client information handling system, following training of the neural network. The CO2 emissions state transition prediction system 280, for example, may feed-forward these input values to produce an initial output estimated CO2 emissions value for the first information handling system 250 during the current monitoring period. The execution of code instructions of the CO2 emissions state transition prediction system in an embodiment may be used to determine whether the output from the neural network indicates a transition from state two to the non-eco-friendly state three based on the input of the updated CO2 state monitoring period JSON incident. If the neural network output indicates such a CO2 emissions state transition, this may indicate a high likelihood that the client information handling system 250 will transition from state two to state three within the current monitoring period. In such an embodiment, the code instructions of the CO2 emissions state transition prediction system executing on hardware processing resources of the UEM platform in an embodiment may transmit an indication to the first client device that the first client device is predicted to transition to the CO2 emissions state three during the next monitoring period. In such a way, the cloud-based CO2 emissions state transition prediction system may predict and notify a user when the client information handling system is likely to move from the second state to the third state by increasing CO2 emissions beyond the non-eco-friendly state transition threshold value due to inefficiencies not related to age.

Figure 3:
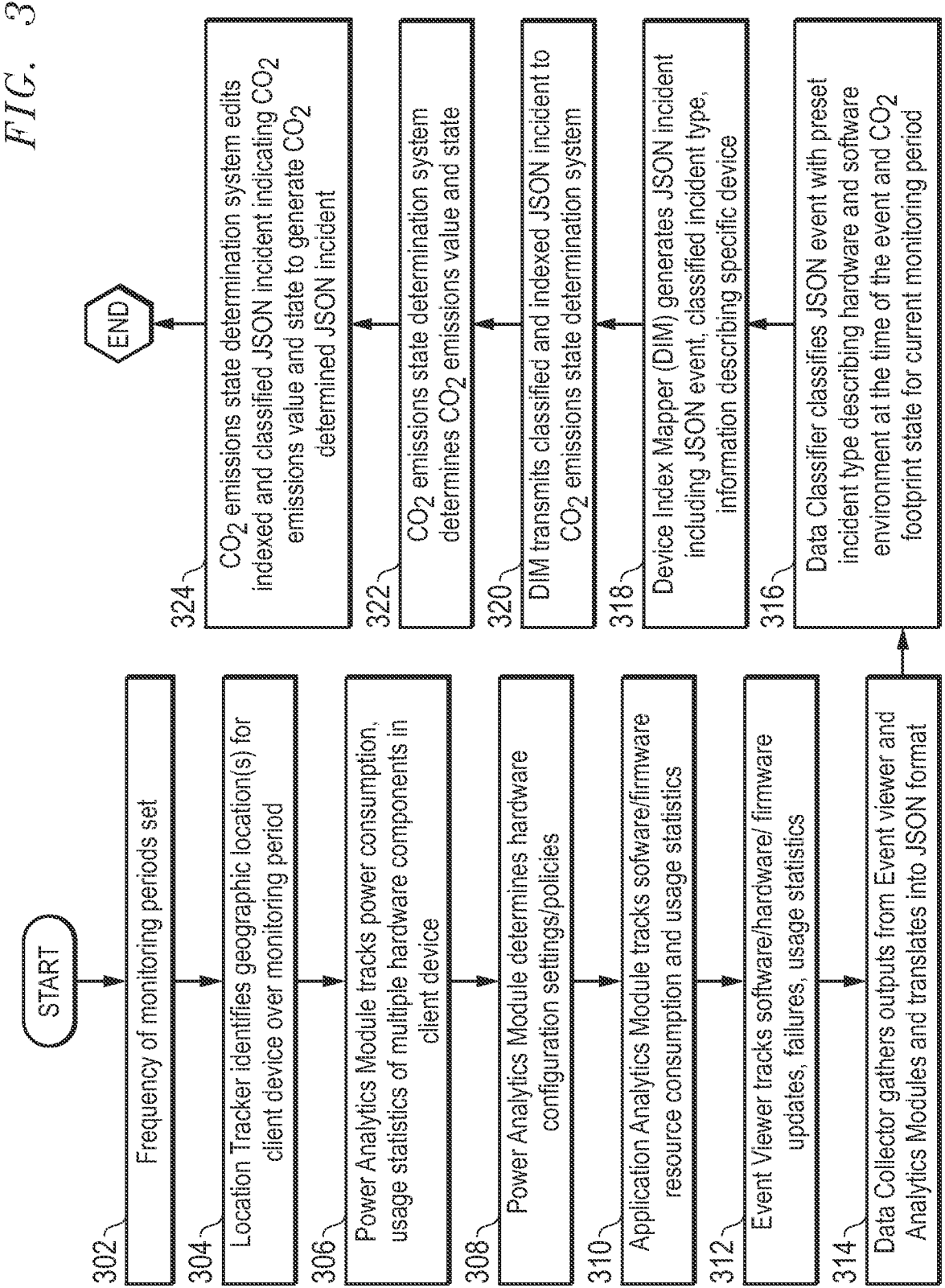
FIG. 3 is a flow diagram illustrating a method of gathering power and application analytics according to an embodiment of the present disclosure.

FIG. 3 is a flow diagram illustrating a method of gathering power and application analytics for predicting a non-age-related increase in CO2 emissions for an information handling system according to an embodiment of the present disclosure. As described herein, a CO2 emissions state determination system in various embodiments may determine a first, optimal efficiency CO2 emissions state, a second monitoring period CO2 emissions state, and a third non-eco-friendly CO2 emissions state for an information handling system based on gathered operational telemetry measurements for the information handling system over a training period. As also described herein, a CO2 emissions state transition prediction system in various embodiments may use a neural network trained on crowd-sourced operational telemetry measurements from a plurality of client information handling systems to model a relationship between operational telemetry measurements and CO2 emissions states. FIG. 3 describes the method of gathering these operational telemetry measurements from a plurality of client information handling systems in the form of JSON incidents.

At block 302, a user of the client information handling system or IT professional within an enterprise management system 230 in an embodiment may set a monitoring period for monitoring CO2 emissions states at the information handling system. For example, in an embodiment described with reference to FIG. 2, the data collector 261 in an embodiment may gather data regarding hardware configuration and power consumption from the power analytics module 240 and data regarding software performance and hardware processor usage from the application analytics module 230 at preset intervals. For example, such a preset interval may be set to a default monitoring period value (e.g., one hour, one day, one week, one month, or other), or may be set by the user of the first client information handling system 200 via the graphical user interface (GUI) 290.

A location tracking in an embodiment may identify a geographic location for the client information handling system over the user-specified monitoring period at block 304. For example, the location sensing unit 248 in an embodiment may determine a geographic location (e.g., zip code, GPS coordinates, city, state, country) in which the first client information handling system 250 is operating.

At block 306, the power analytics module may track power consumption of multiple hardware components in the client information handling system in an embodiment. For example, the power analytics module 240 in an embodiment may monitor power consumption by each of the various hardware components (e.g., 220, 242, 243, 244, 245, 246, 247, 248, or 249) in an embodiment. In some embodiments, such hardware power consumption may be attributed to specific software applications. For example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the data collector 261.

The power analytics module in an embodiment may determine hardware configurations, settings, or policies at block 308. For example, the power analytics module 240 may access firmware for hardware components (e.g., 220, 242, 243, 244, 245, 246, 247, 248, or 249) to determine policies or settings for those components at the time of power measurements made at block 306. More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In yet another example, the power analytics module 240 in an embodiment may determine a current usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the peripheral device 249, location sensing device (e.g., GPS unit) 248, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

At block 310, a hardware processor executing the application analytics module may track software or firmware updates in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. All information accessed in such a way by the application analytics module 230 in an embodiment may be communicated to the data collector 261.

The event viewer may track failed attempts at firmware or software updates in an embodiment at block 312. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 242, 243, 244, 245, 246, 247, 248, or 249) producing the error or consuming the unusually high power levels.

At block 314, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the hardware processor executing code instructions of the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the CO2 emissions state transition prediction system 280. For example, the data collector 261 may generate the following JSON incident based on the information gathered and stored in Table 1, above:

```
{
  "data":
  {
    "event_id": 123456,
    "source_ID" : power_analytics_module,
    "timestamp_unixtime_ms" : 1544145336,
    "client_device_ID" : 456789,
    "client_device_model" : Laptop_7400,
    "location" : Paris_France,
    "custom_flags" :
    {
      "fan_workload" :0.90,
      "Unsuccessful_initialization_attempt":gaming_app,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version":14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "efficiency_battery" : 1.0,
      "usage_time_hours_perday" : 8,
      "fan_power_consumption_watts" : 20,
      "total_power_consumption_watts_perday" : 84,
      "active_browsing_hours_perday" : 8;
    }
  }
}
```

The data classifier in an embodiment may classify objects within the gathered JSON event with preset incident types describing heat measurements, hardware component failures, or software application execution and usage for the client information handling system at the time of the event at block 316. For example, the data classifier 262 in an embodiment may edit the JSON incident created at block 314 by adding an incident classifier. More specifically, the data classifier 262 in an embodiment may analyze the JSON incident comprising operational telemetry measurements generated at block 314 to identify whether any of the JSON events and values associated with preset incident classifiers appear within the JSON incident.

For example, the hardware processor executing the data classifier 262 in an embodiment may determine the JSON incident comprising operational telemetry measurements described above includes the JSON event named "fan_workload," having a value of 0.90, or 90%, which is greater than the preset maximum fan workload of 85%. In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

```
    }
    "incident_class" : Workload,
    "incident_class" : Driver_perf,
    "incident_class" : Config,
  }
```

The hardware processor may execute code instructions of the device index mapper in an embodiment to generate a classified and indexed JSON incident including one or more JSON events and classified incident types at block 318. For example, the device index mapper (DIM) 263 in an embodiment may associate the classified JSON incident comprising operational telemetry measurements with a device ID and device model for the first client information handling system 200. Such a device ID in an embodiment may be one of several device IDs for a plurality of information handling systems (e.g., including the first and second client information handling systems 250 and 270) stored at the CO2 emissions state transition prediction system 280. The device index mapper 263 in an embodiment may then edit the classified JSON incident comprising operational telemetry measurements to generate an indexed and classified JSON incident that includes this information:

```
{
  "data":
  {
    "event_id": 123456,
    "source_ID" : power_analytics_module,
    "timestamp_unixtime_ms" : 1544145336,
    "client_device_ID" : 456789,
    "client_device_model" : Laptop_7400,
    "location" : Paris_France,
    "custom_flags" :
    {
      "fan_workload" :0.90,
      "Unsuccessful_initialization_attempt":gaming_app,
    }
    "device_current_state :
    {
      "NID_1_type" : WLAN,
      "NID_2_type" : WWAN,
      "NID_2_data_transceived" : 100 GB,
      "NID_3_type" : BT,
```

-continued

```
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version":14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 1.0,
        "usage_time_hours_perday" : 8,
        "fan_power_consumption_watts" : 20,
        "total_power_consumption_watts_perday" : 84,
        "active_browsing_hours_perday" : 8;
      }
  }
  "incident_class" : Workload,
}
```

At block 320, the device index mapper may transmit the JSON incident generated at block 318 to the $CO_2$ emissions state determination system of the client information handling system in an embodiment. As described herein, the $CO_2$ emissions state determination system 290 in an embodiment may determine an amount of $CO_2$ emitted due to operation of the client information handling system 250 and define three $CO_2$ emissions states in which the client information handling system 250 may operate during its life cycle. These states may include a first, optimal emissions state, a second monitoring period state, and a third, non-eco-friendly state.

The $CO_2$ emissions state determination system in an embodiment may determine a $CO_2$ emissions value and $CO_2$ emissions state for the client information handling system at block 322. Upon initial purchase of the client information handling system 250 or initial usage, a $CO_2$ determination training period may begin. During this $CO_2$ determination training period, which may have a preset duration, set by the manufacturer or IT manager of the enterprise management system 230, the hardware processor may execute code instructions of a $CO_2$ emissions state determination system to routinely gather indexed and classified JSON incidents from the device index mapper 263. This $CO_2$ determination training period may last for any preset time period, such as for example, three months, or six months, as described below with respect to FIG. 4.

At the end of this preset $CO_2$ determination training period, the $CO_2$ emissions state determination system 290 may determine, for each indexed and classified JSON incident, an amount of $CO_2$ emitted due to power consumed by the client information handling system 250. For example, an indexed and classified JSON incident may identify a total amount of power consumed by all hardware components of the client information handling system 250, as described in greater detail below with respect to FIG. 4. For example, the $CO_2$ emissions state determination system in an embodiment may determine that power consumption at the client information handling system, as recorded within an indexed and classified JSON incident has caused emission of 0.028 pounds $CO_2$ during one day of operation, or an average of 0.028 pounds $CO_2$ per day over a preset time period (e.g., one week).

The $CO_2$ emissions state determination system 290 in an embodiment may also determine the three $CO_2$ emissions states in which the client information handling system 250 may operate during its life cycle based on the indexed and classified JSON incident received from device index manager 263, as described in greater detail with respect to FIG. 4, below. For example, the $CO_2$ emissions state determination system 290 may determine a $CO_2$ emissions state two threshold value of 0.091 pounds $CO_2$ per day to define when the client information handling system 250 may transition from state one to state two (e.g., by moving from emitting less $CO_2$ than the state two threshold value to emitting more $CO_2$ than the state two threshold value). As another example, the $CO_2$ emissions state determination system 290 may determine a $CO_2$ emissions state three threshold value of 0.364 pounds $CO_2$ per day to define when the client information handling system 250 may transition from state two to state three (e.g., by moving from emitting less $CO_2$ than the state three threshold value to emitting more $CO_2$ than the state three threshold value).

Following definition of the $CO_2$ emissions states, as described directly above and in greater detail with respect to FIG. 4 below, a $CO_2$ emissions monitoring period may begin, in which the $CO_2$ emissions state determination system 290 routinely receives indexed and classified JSON incidents (e.g., as described at block 320), and for each JSON incident received, determines the $CO_2$ emissions value (e.g., as described directly above and in greater detail with respect to FIG. 4) and the $CO_2$ emissions state indicated by the indexed and classified JSON incident. In an embodiment, the $CO_2$ emissions state determination system 290 may determine the $CO_2$ emissions state of the client information handling system 250, based on the determined $CO_2$ emissions value and the defining $CO_2$ emissions state threshold values. For example, the $CO_2$ emissions state determination system 290 may determine that the client information handling system 250 that emitted 0.306 pounds $CO_2$ per day, as indicated by a recently received indexed and classified JSON incident, is operating in the second state, because it is above the $CO_2$ emissions state two threshold value of 0.091 pounds $CO_2$ per day, but below the $CO_2$ emissions state three threshold value of 0.364 pounds $CO_2$ per day.

In an embodiment, during the monitoring period following the $CO_2$ determination training period, the hardware processor executing $CO_2$ emissions state determination system 290 may edit the indexed and classified JSON incident received from the device index mapper 263 to include the determined $CO_2$ emissions value, determined $CO_2$ emissions state, and determined $CO_2$ emissions state threshold values. The $CO_2$ emissions state determination system 290 in an embodiment may determine a $CO_2$ emissions value for the client information handling system 250 based on the classified and indexed JSON incident received from the device index mapper 263. This $CO_2$ emissions value determination may be made based on the location of the device, the power consumed by each of the hardware components, the usage time for such power consumption, and the efficiency of the battery, as shown in the indexed and classified JSON incident.

The location of the client information handling system may define an estimated amount of $CO_2$ (in pounds per kWh) emitted during generation of the power consumed by the client information handling system. Carbon footprint for a client information handling system (e.g., 250 or 270) in an embodiment may be based on the measured power consumed by the client information handling system (e.g., 250 or 270), the duration of such consumption, and a location $CO_2$ emissions rate describing the amount of $CO_2$ or other GHGs emitted during generation of each Watt of power consumed by the client information handling system (e.g., 250 or 270). In embodiments, the CO2 emissions state determination system 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the CO2 emissions state determination system 290 may communicate with the CO2 optimization engine 285 or telemetry 282 to determine the location CO2 emissions rate describing the amount of CO2 of other GHGs emitted during generation of each Watt of power consumed by the client information handling system 250 in Paris, France (e.g., the location of the client information handling system 250 as shown in the indexed and classified JSON incident) to be 0.136 pounds CO2 per kWh.

In an example embodiment, the CO2 emissions value may be determined using the equation below to determine the CO2 emissions value for the client information handling system 250 operating in Paris, France, where the location CO2 emissions rate is 0.136 pounds CO2 per kWh, the power consumed is 84 Watts over a usage time of 8 hours at a battery efficiency of 100% is equivalent to 0.091 pounds CO2 per day:

$$\text{CO2 Emissions Value} = \frac{\text{location CO2 emissions rate} * \text{Power Consumed} * \text{Usage Time}}{\text{Battery Efficiency}}$$

The CO2 emissions state determination system 290 in an embodiment may perform this determination of CO2 emissions value for each indexed and classified JSON incident it receives from the device index mapper 263 over the CO2 emissions state determination training period. Following such a determination, the CO2 emissions state determination system 290 may append one or more JSON events indicating the CO2 emissions value within the indexed and classified JSON incident most recently received from the device index mapper 263 and upon which such a determination was made. As described in greater detail below with respect to FIG. 4 below, the CO2 emissions state determination system 290 may also define a CO2 emissions state two threshold value, where CO2 emissions values falling below this CO2 emissions state two threshold value fall within state one. All indexed and classified JSON incidents gathered during the CO2 state determination training period may be grouped into state one. For example, the CO2 emissions state determination system 290 may edit the above classified and indexed JSON incident to create the following CO2 determined JSON incident:

```
{
    "data":
    {
        "event_id": 123457,
        "source_ID" : CO2_emissions_state_prediction_system,
        "timestamp_unixtime_ms" : 1544145338,
        "client_device_ID" : 456789,
        "client_device_model" : Laptop_7400,
        "location" : Paris_France,
        "custom_flags" :
        {
            "fan_workload" :0.90,
            "Unsuccessful_initialization_attempt":gaming_app,
            "CO2_emissions_value_lbsCO2_perday" : 0.091,
            "CO2_emissions_state" : 1,
        }
    "device_current_state :
        {
            "NID_1_type" : WLAN,
            "NID_2_type" : WWAN,
            "NID_2_data_transceived" : 100 GB,
            "NID_3_type" : BT,
            "memory_type" : 16_GB,
            "CPU_type" : X_Series,
            "GPU_type" : G_Series,
            "SSD_type" : 256_GB,
            "Display_type" : 15.6_HD_OLED,
            "fan_driver_version":14.2,
            "Display_mode" : high_definition,
            "Camera_type" : webcam,
            "Camera_detection_mode" : continuous_monitor,
            "Camera_capture_mode" : high_resolution,
            "OS_Version" : 10.2,
            "efficiency_battery" : 1.0,
            "usage_time_hours_perday" : 8,
            "fan_power_consumption_watts" : 20,
            "total_power_consumption_watts_perday" : 84,
            "active_browsing_hours_perday" : 8;
        }
    }
    "incident_class" : Workload,
}
```

Blocks 304-324 may be repeated in an embodiment during a monitoring period following the CO2 determination training period described directly above. These monitoring periods may occur repeatedly throughout the lifecycle of the client information handling system in order to predict, based on gathered CO2 determined JSON incidents, whether the information handling system may imminently shift from state two to the non-eco-friendly state three.

Figure 4:
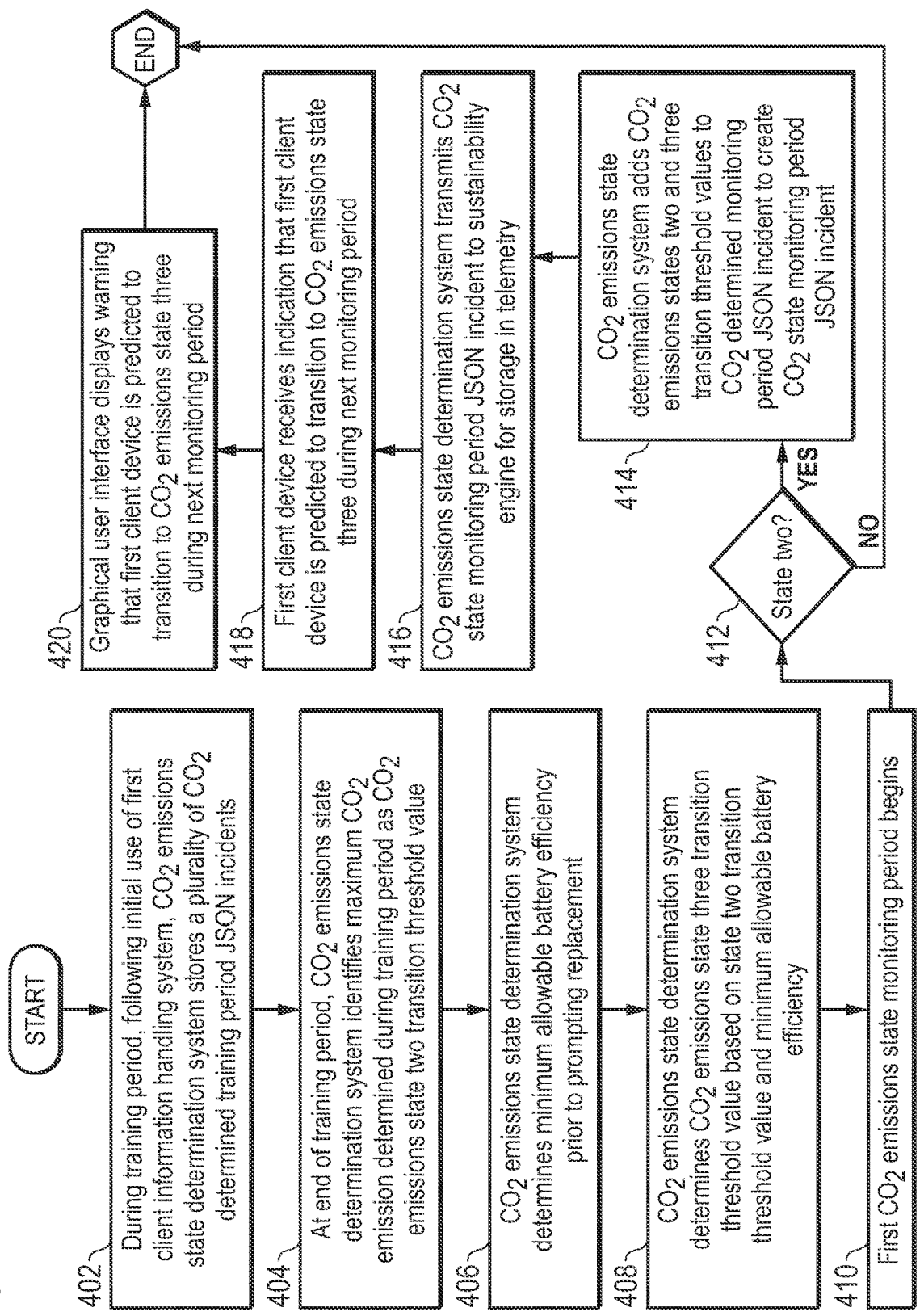
FIG. 4 is a flow diagram illustrating a method of defining a non-eco-friendly $CO_2$ emissions state for a client information handling system according to an embodiment of the present disclosure.

FIG. 4 is a flow diagram illustrating a method of defining a non-eco-friendly CO2 emissions state for a client information handling system based on device performance and age according to an embodiment of the present disclosure. As described herein, code instructions of the carbon dioxide (CO2) emissions state determination system 290 operating via a hardware processor at a client information handling system 250 in an embodiment may set goals for capping CO2 emissions due to operation of the client information handling system 250 that takes the age of the device and its components into account. In an embodiment, the life cycle of each client information handling system (e.g., 250) may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be particular to each client information handling system and its typical usage profile and may take into account the age of each device. The CO2 emissions state determination system may define each of these states based on a plurality of CO2 determined JSON incidents gathered during a CO2 emissions state determination training session.

At block 402, the code instructions of the CO2 emissions state determination system executing on hardware processing resources at a client information handling system in an embodiment may receive JSON incidents at routine intervals from the device index mapper during an initial training period, following first use of the client information handling system. For example, in an embodiment described with respect to FIG. 2, the CO2 emissions state determination system 290 may gather a plurality of CO2 determined JSON incidents (as described in greater detail with respect to FIG. 3 at block 324).

The CO2 emissions state determination system in an embodiment may identify the maximum CO2 emissions value determined during the training period as the CO2 emissions state two transition threshold value at block 404. For example, the CO2 emissions state determination system 290 in an embodiment may determine that the CO2 emissions value of 0.091 pounds CO2 per day identified within the CO2 determined JSON incident described with respect to block 324 of FIG. 3 is the maximum CO2 emissions value identified in all CO2 determined JSON incidents gathered during the CO2 emissions state determination training period in one embodiment.

This maximum CO2 emissions value identified in the plurality of CO2 determined JSON incidents gathered during the CO2 state determination training period may define the threshold CO2 emissions at which the information handling system 290 transitions from the first, optimal CO2 emissions state to the second, monitoring period CO2 emissions state. As described herein, the first state may be defined by a maximum value of pounds of CO2 emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device.

At block 406, the CO2 emissions state determination system may determine a minimum allowable battery efficiency prior to prompting replacement of the battery in an embodiment. These values may be used below to define the boundary between CO2 emissions state two and state three. The CO2 emissions state determination system 290 in an example embodiment may define this minimum allowable battery efficiency at 25%. In such an example embodiment, the CO2 emissions state determination system anticipates that the battery efficiency may degrade down to 25% before the battery will be replaced.

The CO2 emissions state determination system in an embodiment may determine at block 408 the CO2 emissions state three transition threshold value based on the state two transition threshold value and the minimum allowable battery efficiency. As described herein, some decrease in operational efficiency at each client information handling system (e.g., 250) is unavoidable due to wear and tear of components, such as, for example, the battery 244. Thus, the CO2 emitted per hour is expected to increase over time, even when the client device 250 is being used as efficiently as possible, due to decreased efficiency of the battery 244 as it ages. In other words, even if the updating and execution of software and firmware and power consumption of various components (e.g., 220, 242, 243, 245, 246, 247, 248 or 249) are optimized for minimizing CO2 emissions, increases in CO2 emissions during operation of the client information handling system will still occur. The CO2 emissions state transition determination system 290 in an embodiment differentiates such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components).

The second state in embodiments of the present disclosure defines a maximum CO2 emissions value for the client information handling system 250 when the device is being used as efficiently as possible, but that also takes into account the age of the client information handling system 250 and its components (e.g., battery 244). For example, the CO2 emissions state determination system 290 in an embodiment in which the CO2 emissions state two transition threshold value is set at 0.091 pounds CO2 per day and the determined minimum allowable battery efficiency is 25% may determine a CO2 emissions state three transition threshold value of four times the CO2 emissions state two transition threshold value, or 0.364 pounds CO2 per day. This maximum CO2 emissions value defining the second state in embodiments may be referred to herein as a non-eco-friendly state transition threshold value. When operation of the client information handling system 250 causes emission of CO2 beyond this non-eco-friendly state transition threshold value, the client information handling system 250 may pass from the second state to the third, non-eco-friendly state in which inefficient operation of the device unrelated to age causes increased CO2 emissions. In such a way, the CO2 emissions state determination system 290 may estimate CO2 emissions for optimally efficient usage of the client information handling system 250, given the unavoidable drop in efficiency of its battery.

At block 410, the CO2 emissions state determination system may initiate the CO2 emissions state monitoring period. As described herein, blocks 304-324 may be repeated in an embodiment during a monitoring period following the CO2 determination training period described directly above. These monitoring periods may occur repeatedly throughout the lifecycle of the client information handling system 250 in order to predict, based on gathered CO2 determined JSON incidents, whether the information handling system 250 may imminently shift from state two to the non-eco-friendly state three. During such a monitoring period, blocks 304-324 may be repeated in order to produce the following CO2 determined monitoring period JSON incident:

```
{
  "data":
  {
    "event_id": 123458,
    "source_ID" : CO2_emissions_state_prediction_system,
    "timestamp_unixtime_ms" : 1544145340,
    "client_device_ID" : 456789,
    "client_device_model" : Laptop_7400,
    "location" : Paris_France,
    "custom_flags" :
    {
      "fan workload" :0.90,
      "Unsuccessful_initialization_attempt":gaming_app,
      "CO2_emissions_value_lbsCO2_perday" : 0.306,
      "CO2_emissions_state" : 2,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version":14.2,
      "Display_mode" : high_definition,
      "Camera_type" : webcam,
```

```
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 12,
        "fan_power_consumption_watts" : 40,
        "total_power_consumption_watts_perday" : 110,
        "active_browsing_hours_perday" : 8,
      }
    }
    "incident_class" : Workload,
}
```

The execution of the data segregator of the client information handling system may determine at block 412 whether the client information handling system is operating within the CO2 emissions state two. The data segregator 266 in an embodiment may operate to narrow the number of CO2 determined JSON incidents transmitted to the CO2 emissions state predictions system 280 at the Unified Endpoint Management (UEM) platform 200. As described herein, execution of code instructions for the CO2 emissions state predictions system 280 via hardware processing resources in an embodiment may predict when an information handling system (e.g., 250 or 270) that is currently operating in CO2 emissions state two may imminently transition to the CO2 emissions state three (non-eco-friendly state). Because the CO2 emissions state transition prediction system 280 in such an embodiment only analyzes future performance of client information handling systems (e.g., 250 or 270) currently operating within the CO2 emissions second state, only CO2 determined JSON incidents from those information handling systems (e.g., 250 or 270) currently operating in the CO2 emissions second state need be transmitted to the CO2 emissions state transition prediction system 280.

In some embodiments, a separate neural network may be trained for each usage profile identified by the data segregator 266 within the CO2 state monitoring period JSON incidents for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage_profile" having a value of "corporate," or any of the other above-described usage profiles or other contemplated usage profiles within the CO2 state monitoring period JSON incident.

The data segregator 266 in an embodiment may make such a determination by referencing the CO2 determined monitoring period JSON incident described directly above to identify that the determined CO2 emissions value of 0.306 is above the CO2 emissions state two transition threshold value of 0.091 in one example embodiment. If the data segregator determines the client information handling system is operating outside of state two (e.g., state one or three), this may indicate no need to transmit the updated CO2 determined monitoring period JSON incident to the CO2 emissions state transition prediction system, and the method may end. If the data segregator determines the client information handling system is operating within state two, the method may proceed to block 414 for preparing the CO2 determined monitoring period JSON incident for transmission to the CO2 emissions state transition prediction system at the UEM platform.

At block 414, in an embodiment in which the client information handling system is currently operating within the CO2 emissions state two, the CO2 emissions state determination system includes CO2 emissions state two transition threshold value and CO2 emissions state three transition threshold value to the CO2 determined monitoring period JSON incident to create a CO2 state monitoring period JSON incident. For example, the CO2 emissions state determination system may include the CO2 emissions state two transition threshold value and CO2 emissions state three transition threshold value with the CO2 determined monitoring period JSON incident described above with respect to block 410 to provide the following CO2 state monitoring period JSON incident:

```
{
  "data":
  {
    "event_id": 123458,
    "source_ID" : CO2_emissions_state_prediction_system,
    "timestamp_unixtime_ms" : 1544145340,
    "client_device_ID" : 456789,
    "client_device_model" : Laptop_7400,
    "location" : Paris_France,
    "custom_flags" :
      {
        "fan_workload" :0.90,
        "Unsuccessful_initialization_attempt":gaming_app,
        "CO2_emissions_value_lbsCO2_perday" : 0.306,
        "CO2_emissions_state" : 2,
        "CO2emissions_statetwo_threshold" : 0.091,
        "CO2emissions_statethree_threshold" : 0.364,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version":14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 12,
        "fan_power_consumption_watts" : 40,
        "total_power_consumption_watts_perday" : 110,
        "active_browsing_hours_perday" : 8,
      }
    }
    "incident_class" : Workload,
}
```

The CO2 emissions state determination system in an embodiment at block 416 may transmit the CO2 state monitoring period JSON incident generated at block 414 to the communication agent for the CO2 emissions state transition prediction system for UEM platform 200 monitoring a plurality of client information handling systems including the client information handling system 250. For example, the CO2 emissions state determination system 290 in an embodiment may transmit the CO2 state monitoring period JSON incident shown directly above to the communication agent 281 for the CO2 emissions state transition prediction system 280 operating at the UEM platform 200. In such a way, the CO2 emissions state determination system 290 may estimate CO2 emissions for optimally efficient usage of the client information handling system, given the unavoidable drop in efficiency of its battery.

The first client device in an embodiment may receive an indication from the communication agent that the first client device is predicted to transition to CO2 emissions state three during the next monitoring period at block 418. For example, as described below with respect to FIG. 5, the CO2 emissions state transition prediction system 280 may transmit a notification, determined based on a most recently recorded CO2 state monitoring period JSON incident by a crowd-source trained neural network, that the CO2 emissions state transition prediction system 280 predicts the first client information handling system 250 may transition from the CO2 emissions state two to the non-eco-friendly CO2 emissions state three during the current monitoring period at the first client information handling system 250.

At block 422, a graphical user interface (GUI) at the first client information handling system may display a warning to the user that the first client information handling system is predicted to transition to CO2 emissions state three during the next monitoring period. For example, the GUI 291 may display a notification to the user of the first client information handling system 250 that the device is predicted to transition from CO2 emissions state two to the non-eco-friendly CO2 emissions state three during the current monitoring period if the user continues current usage of the client information handling system 250. The method for defining a non-eco-friendly CO2 emissions state for a client information handling system based on device performance and age may then end.

FIG. 5 is a flow diagram illustrating a method of predicting an information handling system transition to a non-eco-friendly CO2 emissions state using a neural network trained on crowd-sourced CO2 state monitoring period JSON incidents according to an embodiment of the present disclosure. As described herein, execution of code instructions for a cloud-based CO2 emissions state transition prediction system may predict when the client information handling system via hardware processing resources at a UEM platform is likely to move from the second state to the third state by increasing CO2 emissions beyond the non-eco-friendly state transition threshold value described above, due to inefficiencies not related to age. The CO2 emissions state transition prediction system in embodiments may notify the user of the client information handling system of such a predicted upcoming transition to the third state.

At block 502, the communication agent operating at the UEM platform in an embodiment may receive and store in telemetry CO2 state monitoring period JSON incidents from a plurality of client information handling systems over a plurality of monitoring periods. These CO2 state monitoring period JSON incidents may include operational telemetry measurements such as power analytics, software application analytics, and event viewer error logs, as well as determined CO2 emissions values and state transition threshold values unique to each client information handling system. These CO2 state monitoring period JSON incidents may be gathered (e.g., as described above with respect to blocks 414-416 of FIG. 4) during routine monitoring periods from a plurality of client information handling systems at the cloud-based CO2 emissions state transition prediction system. For example, the communication agent 281 in an embodiment described above with respect to FIG. 2 may receive a plurality of CO2 state monitoring period JSON incidents from the first client information handling system 250 and the second client information handling system 270 over a plurality of monitoring periods.

In some embodiments, each CO2 state monitoring period JSON incident received from a client information handling system may identify a usage profile or type defining the ways in which each client information handling system is used during its operation. As described in greater detail below with respect to FIG. 5, in some embodiments, a separate neural network may be trained for each usage profile identified by the data segregator 266 within the CO2 state monitoring period JSON incidents for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage_profile" having a value of "corporate," or any of the other above-described usage profiles or other contemplated usage profiles within the CO2 state monitoring period JSON incident.

These received CO2 state monitoring period JSON incidents may then be stored in telemetry 282. Using these crowd-sourced operational telemetry measurements from a plurality of client information handling systems (e.g., 250 and 270), and CO2 emissions values, the cloud-based CO2 emissions state transition prediction system 280 in embodiments may train a feed-forward neural network 286 to model a relationship between changes in CO2 emissions values and changes in operational telemetry measurements to predict when a client information handling system (e.g., 250) is likely to transition to a non-eco-friendly CO2 emissions state three.

In some embodiments, code instructions of a systems internal health assessor (SIHA) executing on processing resources at the Unified Endpoint Management (UEM) platform may identify one or more CO2 state monitoring period JSON incidents indicating hardware failure. For example, the SIHA 283 operating at the UEM platform 200 in an embodiment may identify one or more CO2 state monitoring period JSON incidents received from the client information handling system (e.g., 250 or 270) indicating hardware failure at those devices. This block is optional and not required in order to train and execute the neural network 286 to predict state transitions.

A systems internal health assessor (SIHA) of the UEM platform 200 in an embodiment may identify the CO2 state monitoring period JSON incident received at block 502 as indicating failure of a hardware component of a given hardware type, or substantial functional inefficiency. For example, the SIHA 283 in an embodiment may search the CO2 state monitoring period JSON incident described above with respect to block 414, which has been transmitted to the communication agent 281 and stored in telemetry 282 for JSON events named "WHEA_Error," indicating an error, such as a substantial inefficiency in the function a hardware component. Upon identification of such an error, alone or as part of a sequence of errors, associated with an identified hardware component, the SIHA 283 may transmit a notification to the communication agent 281 that the CO2 state monitoring period JSON incident (e.g., identified by event_id given within the CO2 state monitoring period JSON incident), or sequence of JSON incidents indicates poor health of a hardware component. In other embodiments, the SIHA 283 may identify CO2 state monitoring period JSON events named "WHEA_Error," having values identifying any of the hardware components (e.g., 220, 242, 243, 244, 245, 246, 247, 248, or 249) included within the first client information handling system 250. The SIHA 283 in such embodiments may accordingly notify the communication agent 281 of the CO2 state monitoring period JSON incident including such errors or sequence of errors and indicating poor health of the identified hardware component.

In another aspect, the telemetry 282 may also comprise failed operational telemetry including results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs translated into CO2 state monitoring period JSON incidents of hardware failures, errors, or underperformance or sequences of the same at reporting client information handling systems (e.g., 250 or 270). In other embodiments, the SIHA 283 may determine that a component is failing if one or more CO2 state monitoring period JSON incidents for the information handling system (e.g., 250) using that hardware component (e.g., 242) include a number of errors for that component (e.g., 242) that meets or exceeds a maximum error threshold (e.g., numbers of errors at 100, 50, 10, 5) within a preset period of time (e.g., 24 hours) and which may be alone or in combination with a sequence of errors. These are only example maximum error threshold values and preset time period values, and any values for these thresholds are contemplated herein.

As another example, the SIHA 283 may determine that a component is failing if one or more CO2 state monitoring period JSON incidents for the information handling system (e.g., 250) indicate a test benchmark score for that component (e.g., 242) that falls below a preset minimum benchmark threshold value (e.g., 85% of average crowd-sourced benchmark value) alone or as port of a sequence of errors or reported issues. As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a hardware processor is failing may be 90%, for example.

At block 506, the hardware processing resource executing code instructions of the CO2 emissions state transition prediction system in an embodiment may train a neural network at the UEM platform to model a relationship between changes in CO2 emissions values over a most recent monitoring period and changes in telemetry measurements in CO2 state monitoring period JSON incidents received from a plurality of client devices over the monitoring period immediately preceding the most recent monitoring period. For example, the neural network 286 described in an embodiment with reference to FIG. 2 may be a feed-forward neural network designed to model this relationship. More specifically, the input layer of the neural network 286 may comprise a plurality of nodes, with each node representing a value given within a received CO2 state monitoring period JSON incident for a named JSON event. For example, a first node of the input layer may hold a value of "20" for the JSON event named "active_browsing_hours_perday." This input node may thus always hold a value, if one is given within a specific CO2 state monitoring period JSON incident, for JSON events having a name "active_browsing_hours_perday."

Other examples of JSON event names defining other input nodes may include a plurality of operational telemetry measurements that are adjustable by a user and potentially included within gathered CO2 state monitoring period JSON incidents. A list of such user-adjustable operational telemetry measurements and their associated JSON event names may be stored in telemetry 282 in an example embodiment. Examples of user-adjustable operational telemetry measurements in an embodiment may include any policy setting adjustable by the power analytics module 240 or the application analytics module 230. More specifically, these user-adjustable operational telemetry measurements may include indication that the network interface device 220 is transceiving according to the Bluetooth®, rather than WLAN, WWAN, or in RDP, or that the network interface device 220 is set to receive remote calls, or operate as a mirror server. In still other examples, user-adjustable operational telemetry measurements in an embodiment may include identification of a current usage mode for the display 245, number of periods in which sensing hardware have been operational, current media capture instruction settings for the camera 247. In yet other examples, user-adjustable operational telemetry measurements in an embodiment may include identification of capacity for the hardware processor 242 or the memory 246 being used by specifically identified software applications, number of repeated interrupts to the CPU 242 or GPU 246, percentage of total capacity for the hardware processor 242 or memory 246 being used by idle or background applications, or number of active windows within a browsing software application (e.g., Google® Chrome @, Firefox®).

An output layer of the feed-forward neural network may include a predicted $CO_2$ emissions value and a predicted $CO_2$ emissions state for the client information handling system. The purpose of this neural network may be to predict what $CO_2$ emissions state the client information handling system may reach during a monitoring period beginning immediately after a known set of operational telemetry measurements are taken and translated into a $CO_2$ state monitoring period JSON incident. In other words, the value of the output node may reflect a predicted value for the $CO_2$ emissions state that may occur during a second monitoring period beginning immediately after the operational telemetry measurements input into the neural network have been recorded during a first monitoring period. As a more specific example embodiment in which each monitoring period lasts seven days or one week, an output node of the neural network may reflect a predicted value for the $CO_2$ emissions state that may occur within the next week, after the operational telemetry measurements recorded over the past week have been input into the neural network. In other embodiments in which the monitoring period lasts one day, one month, or one fiscal quarter, the output layer may include an output node that reflects a predicted value for the $CO_2$ emissions state that may occur within the next day, month, or fiscal quarter, respectively. The neural network may contain a plurality of hidden layers between the input and output layers, which may each be associated with an array of weights that define the relationships between each of the nodes of the input layer (e.g., each of the known user-adjustable operational telemetry measurements) and an output predicted $CO_2$ emissions state.

The $CO_2$ emissions state transition prediction system 280 in an embodiment may begin training the neural network by performing a first forward propagation for an initial $CO_2$ state monitoring period JSON incident. In the example referred to at block 414 of FIG. 4, one or more values of one or more JSON events shown in the $CO_2$ state monitoring period JSON incident having a timestamp of 1544145340 may be fed into the neural network. An initial estimate output node predicting the $CO_2$ emissions state of a monitoring period following the time associated with the timestamp 1544145340 may then be output via block 506. As described above at block 502, the $CO_2$ emissions state transition prediction system 280 in an embodiment may receive similar $CO_2$ state monitoring period JSON incidents at routine intervals. For example, the $CO_2$ emissions state transition prediction system 280 may receive the following $CO_2$ state monitoring period JSON incident at the timestamp 1544145400, following the initial feeding-forward of the $CO_2$ state monitoring period JSON incident:

```
{
  "data":
  {
    "event_id": 123459,
    "source_ID" : CO2_emissions_state_prediction_system,
    "timestamp_unixtime_ms" : 1544145400,
    "client_device_ID" : 456789,
    "client_device_model" : Laptop_7400,
    "location" : Paris_France,
    "custom_flags" :
    {
      "fan_workload" :0.90,
      "WHEA_Error" : fan,
      "Unsuccessful_initialization_attempt":gaming_app,
      "CO2_emissions_value_lbsCO2_perday" : 0.332,
      "CO2_emissions_state" : 2,
      "CO2emissions_statetwo_threshold" : 0.091,
      "CO2emissions_statethree_threshold" : 0.364,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version":14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "efficiency_battery" : 0.59,
      "usage_time_hours_perday" : 12,
      "fan_power_consumption_watts" : 60,
      "total_power_consumption_watts_perday" : 120,
      "active_browsing_hours_perday" : 12,
    }
  }
  "incident_class" : Workload,
  "incident_class" : Config,
}
```

The $CO_2$ emissions state transition prediction system 280 in an embodiment may generate an initial error function by comparing the actual $CO_2$ emissions value of 0.332 pounds $CO_2$ per day found in the above $CO_2$ state monitoring period JSON incident to the initial output predicted $CO_2$ emissions value of 0.306 pounds $CO_2$ per day determined using the initial feed-forward of the earlier-recorded operational telemetry measurements found in the example $CO_2$ state monitoring period JSON incident described with respect to FIG. 4 at block 414. The difference between these values may be back propagated through the hidden layers of the neural network to adjust each of the associated weight arrays. By performing such a feed-forward and back-propagation method repeatedly, the neural network 286 may be trained to model a relationship between each of the user-adjustable operational telemetry measurement values indicated within the earlier-recorded $CO_2$ state monitoring period JSON incident and the $CO_2$ emissions state indicated within the later-recorded $CO_2$ state monitoring period JSON incident. The $CO_2$ emissions state transition prediction system 280 may further train the neural network 286 on other sets of received $CO_2$ state monitoring period JSON incidents from a plurality of client information handling systems (e.g., 250 and 270) using the same frequency of monitoring periods as that used by the information handling system 250. In such a way, the $CO_2$ emissions state transition prediction system 280 may use crowd-sourced $CO_2$ state monitoring period JSON incidents across a plurality of client information handling systems to train the neural network 286 to model the relationship between various user-adjustable operational telemetry measurements in an earlier monitoring period and a future CO2 emissions state for a later monitoring period.

In some embodiments, a separate neural network may be trained for each usage profile identified by the data segregator 266 within the CO2 state monitoring period JSON incidents for the plurality of client information handling systems. For example, in an embodiment in which telemetry 282 stores CO2 state monitoring period JSON incidents including usage profiles such as "corporate," "testing," "application_development," "home_use," or "gaming," a separate neural network (e.g., 286) may be trained for each of these usage profiles. In such an embodiment, for example, a neural network (e.g., 286) trained to predict when a client information handling system (e.g., 250) having a usage profile of "corporate" will transition from CO2 emissions state value two to the non-eco-friendly CO2 emissions state value three may only use CO2 state monitoring period JSON incidents crowd-sourced from other client information handling systems (e.g., 270) having a usage profile of "corporate" during the training of the neural network.

At block 508, code instructions of the CO2 emissions state transition prediction system executing on hardware processing resources at the UEM platform in an embodiment may receive an updated CO2 state monitoring period JSON incident from a first client information handling system, following training of the neural network. For example, the CO2 emissions state transition prediction system 280 may receive the following updated CO2 state monitoring period JSON incident from the first client information handling system 250, following training of the neural network 286 using a plurality of crowd-sourced CO2 state monitoring period JSON incidents:

```
{
  "data":
  {
    "event_id": 123460,
    "source_ID" : CO2_emissions_state_prediction_system,
    "timestamp_unixtime_ms" : 1544145450,
    "client_device_ID" : 456789,
    "client_device_model" : Laptop_7400,
    "location" : Paris_France,
    "custom_flags" :
    {
      "fan_workload" :0.90,
      "WHEA_Error" : fan,
      "Unsuccessful_initialization_attempt":gaming_app,
      "CO2_emissions_value_lbsCO2_perday" : 0.35,
      "CO2_emissions_state" : 2,
      "CO2emissions_statetwo_threshold" : 0.091,
      "CO2emissions_statethree_threshold" : 0.364,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version":14.2,
      "Display_mode" : high_definition,
      "Camera_type" : webcam,
      "Camera_detection_mode" : continuous_monitor,
      "Camera_capture_mode" : high_resolution,
      "OS_Version" : 10.2,
      "efficiency_battery" : 0.59,
      "usage_time_hours_perday" : 15,
      "fan_power_consumption_watts" : 60,
      "total_power_consumption_watts_perday" : 100,
      "active_browsing_hours_perday" : 15,
    }
  }
  "incident_class" : Workload,
  "incident_class" : Config,
}
```

The code instructions of the CO2 emissions state transition prediction system executing on hardware processing resources at the UEM platform in an embodiment at block 510 may input the updated CO2 state monitoring period JSON incident from the first client information handling system into the crowd-source trained neural network. The CO2 emissions state transition prediction system 280, for example, may input the updated CO2 state monitoring period JSON incident received at block 508 and measuring operational telemetry during the previous monitoring period for the client information handling system 250 into the neural network 286 and feed-forward these input values to produce an initial output estimated CO2 emissions value for the first information handling system 250 during the current monitoring period.

At block 512, the execution of code instructions of the CO2 emissions state transition prediction system in an embodiment may determine whether the output from the neural network indicates a transition from state two to the non-eco-friendly state three based on the input of the updated CO2 state monitoring period JSON incident received at block 508. If the neural network output indicates such a CO2 emissions state transition, this may indicate a high likelihood that the client information handling system 250 will transition from state two to state three within the current monitoring period, and the method may proceed to block 514 to notify the client information handling system 250 of this prediction. If the neural network output does not indicate such a CO2 emissions state transition, the method may return to block 508 for receipt of a newly updated CO2 state monitoring period JSON incident at the end of the current monitoring period. By repeating the loop between blocks 508 and 512 in such a manner, the CO2 emissions state transition prediction system 280 in an embodiment may routinely monitor and test telemetry received from an individual client information handling system 250 during each consecutive monitoring period to identify when the client information handling system 250 is predicted to transition from state two to state three, prior to occurrence of such a transition.

At block 514, the code instructions of the CO2 emissions state transition prediction system executing on hardware processing resources of the UEM platform in an embodiment where the client information handling system is predicted to transition from CO2 emissions state two to three may transmit an indication to the first client device that the first client device is predicted to transition to the CO2 emissions state three during the next monitoring period. In such a way, the cloud-based CO2 emissions state transition prediction system may predict and notify a user when the client information handling system is likely to move from the second state to the third state by increasing CO2 emissions beyond the non-eco-friendly state transition threshold value due to inefficiencies not related to age. The method for predicting an information handling system transition to a non-eco-friendly CO2 emissions state using a neural network trained on crowd-sourced CO2 state monitoring period JSON incidents may then end.

The blocks of the flow diagrams of FIGS. 3, 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A carbon dioxide (CO2) emissions state transition prediction system executing on a unified endpoint management (UEM) platform information handling system comprising:
    a network interface device to receive operational telemetry measurements for a first client information handling system during routine monitoring intervals, including power analytics, software application analytics, event viewer error logs, a determined CO2 emissions value, and a non-eco-friendly state transition threshold value determined for the first client information handling system;
    a hardware processor executing code instructions of the CO2 emissions state transition prediction system to predict, via a neural network modeling a relationship between changes in CO2 emissions values over a most recent monitoring period and changes in user-adjustable operational telemetry measurements over a prior monitoring period immediately preceding the most recent monitoring period, that a future determined CO2 emissions value for the first client information handling system determined based on operational telemetry measurements recorded during the current routine monitoring interval will exceed the non-eco-friendly state transition threshold value; and
    the network interface device to transmit an indication for display to a user of the first client information handling system via a graphical user interface (GUI) that the first client information handling system is predicted to reach a non-eco-friendly state during the current routine monitoring interval.

2. The information handling system of claim 1, wherein the determined CO2 emissions value is determined for each routine monitoring interval at the first client information handling system based on power consumption and physical location of the first client information handling system.

3. The information handling system of claim 1, wherein the non-eco-friendly state transition threshold value is determined for each routine monitoring interval at the first client information handling system based on battery power consumption efficiency loss after a preset training period.

4. The information handling system of claim 1, wherein the non-eco-friendly state transition threshold value is determined for each routine monitoring interval at the first client information handling system based on battery age.

5. The information handling system of claim 1, wherein the non-eco-friendly state transition threshold value is determined for each routine monitoring interval at the first client information handling system based on testing telemetry measurements, including power analytics, software application analytics, event viewer error logs, and a determined CO2 emissions value measured during a preset testing period.

6. The information handling system of claim 1 further comprising:
    the hardware processor to train the neural network using crowd-sourced operational telemetry measurements gathered from a plurality of client information handling systems including the first information handling system over a plurality of routine monitoring periods.

7. The information handling system of claim 1, wherein the user adjustable operational telemetry measurements include a hardware component failure event at the client information handling system identified by a systems internal health assessor at the UEM platform.

8. A method of determining at a client information handling system a carbon dioxide (CO2) emissions state comprising:
    collecting testing operational telemetry measurements for hardware components of a client information handling system during routine testing period intervals, including power analytics for power consumption, software application analytics for hardware component utilization, and event viewer error logs for hardware health;
    determining CO2 emissions values for each of the routine testing period intervals, via a hardware processor executing code instructions of a CO2 emissions state determination system, based on measurements of power consumption, battery efficiency, usage time, and location for the client information handling system within the collected testing operational telemetry measurements;
    defining, via the hardware processor, a CO2 emissions state two transition threshold value as equivalent to an identified maximum CO2 emissions value determined for each of the routine testing period intervals;
    defining, via the hardware processor, a non-eco-friendly CO2 emissions state three transition threshold value based on the CO2 emissions state two transition threshold value and a determined minimum allowable battery efficiency value;

determining CO2 emissions values for each of a plurality of the routine monitoring period intervals, via the hardware processor, based on the collected monitoring operational telemetry measurements for a client information handling system during the routine monitoring period intervals;

transmitting to a cloud-based CO2 emissions state transition prediction system, via a network interface device, the monitoring operational telemetry measurements, determined CO2 emissions values, and the non-eco-friendly state three transition threshold value;

receiving a notification from the cloud-based CO2 emissions state transition prediction system, that the client information handling system is predicted to reach a non-eco-friendly state during an upcoming routine monitoring interval; and displaying, via a graphical user interface (GUI), the received notification.

9. The method of claim 8, wherein the monitoring operational telemetry measurements include measurement that a software application or firmware is consuming resources of a memory above a maximum resource threshold at the client information handling system.

10. The method of claim 8, wherein the monitoring operational telemetry measurements include a measurement that a software application or firmware is consuming resources of the network interface device above a maximum resource threshold at the client information handling system.

11. The method of claim 8, wherein the monitoring operational telemetry measurements include indication that the client information handling system has turned on a service to act as a mirror server to a remote server in communication with the client information handling system via the network interface device.

12. The method of claim 8, wherein the monitoring operational telemetry measurements include an indication that the network interface device at the client information handling system is transceiving according to a remote desktop protocol.

13. The method of claim 8, wherein the monitoring operational telemetry measurements include an indication that a policy setting allows remote users to make calls to the hardware processor at the client information handling system via the network interface device.

14. The method of claim 8, wherein the monitoring operational telemetry measurements include an indication that execution of a peripheral device consumes resources of a hardware component of the client information handling system above a maximum resource threshold.

15. A carbon dioxide (CO2) emissions state transition prediction system executing on a unified endpoint management (UEM) platform information handling system comprising:

a network interface device to receive operational telemetry measurements for a first client information handling system during routine monitoring intervals, including power analytics, software application analytics, event viewer error logs, a determined CO2 emissions value, and a non-eco-friendly state transition threshold value determined for the first client information handling system;

a hardware processor executing code instructions of the CO2 emissions state transition prediction system to:

train a neural network using crowd-sourced operational telemetry measurements gathered from a plurality of client information handling systems including from the first client information handling system over a plurality of routine monitoring periods, where the neural network is trained to model a relationship between changes in CO2 emissions values over a most recent monitoring period of the first client information handling system and changes in the operational telemetry measurement over a prior monitoring period of the first client information handling system immediately preceding the most recent monitoring period;

predict that a future determined CO2 emissions value for the first client information handling system determined based on operational telemetry measurements recorded during the current routine monitoring interval will exceed the non-eco-friendly state transition threshold value; and the network interface device to transmit an indication for display to a user of the first client information handling system via a graphical user interface (GUI) that the first client information handling system is predicted to enter a non-eco-friendly state during an upcoming routine monitoring interval.

16. The information handling system of claim 15, wherein the user adjustable operational telemetry measurements include an indication that execution of a peripheral device is consuming resources of a hardware component of the first client information handling system above a maximum resource threshold.

17. The information handling system of claim 15, wherein the user adjustable operational telemetry measurements include an indication or execution of an outdated software or firmware version at the first client information handling system.

18. The information handling system of claim 15, wherein the user adjustable operational telemetry measurements include an indication that a background software application is consuming resources of a hardware component of the first client information handling system above a maximum resource threshold.

19. The information handling system of claim 15, wherein the user adjustable operational telemetry measurements include an indication that a browsing software application executing active browsing sessions for an average daily browsing time measurement exceeds a daily browsing maximum threshold at the first client information handling system.

20. The information handling system of claim 15, wherein the user adjustable operational telemetry measurements include an indication that a software application or firmware consumes resources of the hardware processor of the first client information handling system above a maximum resource threshold.

* * * * *